United States Patent
Kawase

(10) Patent No.: US 6,787,275 B2
(45) Date of Patent: Sep. 7, 2004

(54) COLOR FILTER AND MANUFACTURING METHOD THEREFOR, DISPLAY DEVICE AND ELECTRONIC EQUIPMENT

(75) Inventor: Tomomi Kawase, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/261,632

(22) Filed: Oct. 2, 2002

(65) Prior Publication Data

US 2003/0076609 A1 Apr. 24, 2003

(30) Foreign Application Priority Data

Oct. 2, 2001 (JP) ........................................ 2001-306885
Oct. 1, 2002 (JP) ........................................ 2002-289081

(51) Int. Cl.[7] ................................................. G02B 5/20
(52) U.S. Cl. ............................. 430/7; 349/106; 313/584
(58) Field of Search ............................ 430/7; 349/106; 313/582, 584

(56) References Cited

U.S. PATENT DOCUMENTS 5,907,377 A * 5/1999 Nishida et al. ............. 349/106
6,042,974 A * 3/2000 Iwata et al. .................... 430/7

FOREIGN PATENT DOCUMENTS

| EP | 0 702 250 A2 | 3/1996 |
|---|---|---|
| JP | A 62-066941 | 3/1987 |
| JP | A 01-148557 | 6/1989 |
| JP | 08-146214 | 6/1996 |
| JP | A 8-146214 | 6/1996 |
| JP | 10-133194 | 5/1998 |
| JP | 10-148709 | 6/1998 |
| JP | 10-160925 | 6/1998 |
| JP | 10-170712 | 6/1998 |
| JP | 10-268126 | 10/1998 |
| JP | A 10-282329 | 10/1998 |
| JP | A 10-286977 | 10/1998 |
| JP | 11-023833 | 1/1999 |
| JP | A 11-248926 | 9/1999 |
| JP | A 2000-094707 | 4/2000 |
| JP | A 2000-127419 | 5/2000 |
| JP | A 2000-310706 | 11/2000 |

* cited by examiner

*Primary Examiner*—John A. McPherson
(74) *Attorney, Agent, or Firm*—Oliff & Berridge, PLC

(57) ABSTRACT

A color filter is provided which is low cost, has excellent flatness of the over coat layer, and has reduced thickness and excellent light transmittance. The color filter is a filter in which a plurality of colored sections are formed on a substrate, which color filter if made by a method wherein a plurality of concave sections are formed on one surface of the substrate, an ink repellant layer is formed between adjacent concave sections, formation sections are formed comprising the concave sections and the ink repellant layer, and colored sections are then formed in each formation section.

23 Claims, 28 Drawing Sheets

R G B

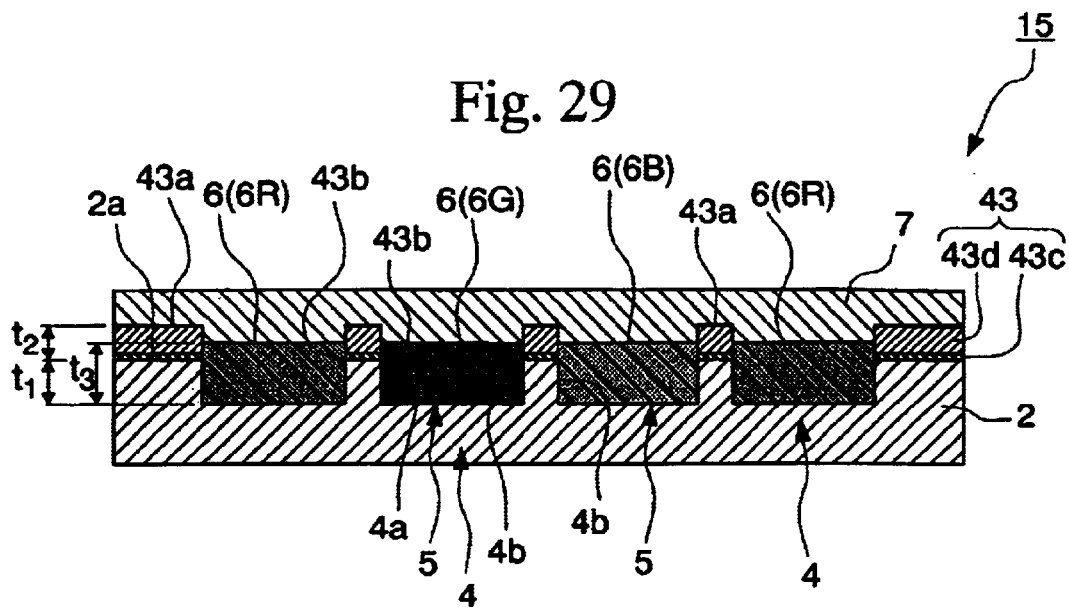
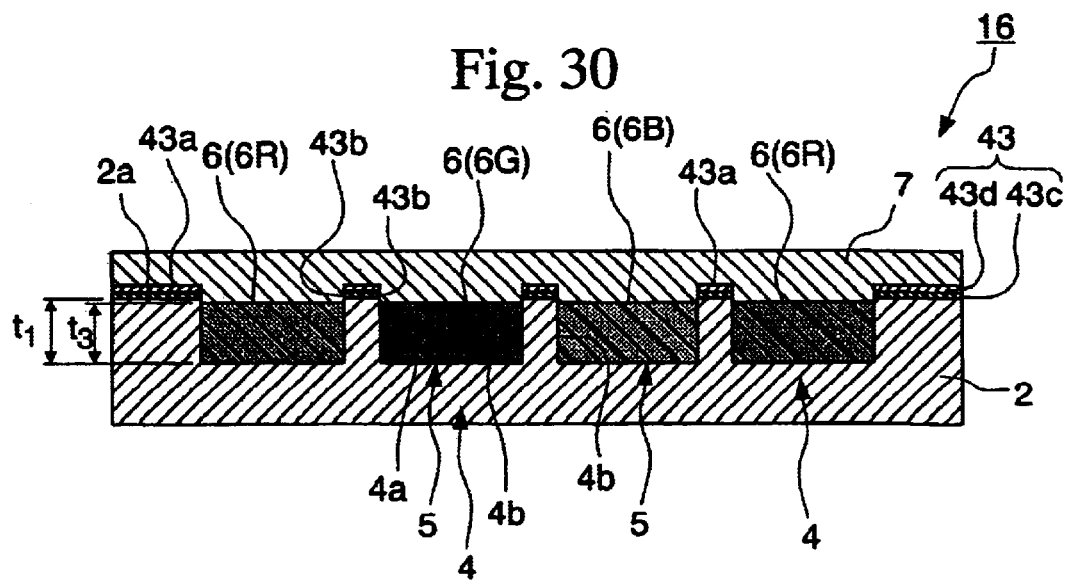

COLOR FILTER AND MANUFACTURING METHOD THEREFOR, DISPLAY DEVICE AND ELECTRONIC EQUIPMENT

TECHNICAL FIELD

The present invention relates to a color filter and a manufacturing method therefor, and a display device and electronic equipment, and relates specifically to the colored sections of color filters.

BACKGROUND ART

In recent years, in electronic equipment such as notebook computers, mobile telephones and electronic organizers, display devices such as liquid crystal display devices and plasma discharge display devices have become widely used as devices for displaying information. Recently, display devices in which full color display is made possible by providing a color filter on one of the substrates have become mainstream.

A color filter is formed by arranging R (red), G (green) and B (blue) colored sections in an arrangement such as a stripe arrangement, a delta arrangement or a mosaic arrangement on the surface of a substrate made of glass or plastic or the like. There are several methods for manufacturing this color filter, which are classified into several groups according to the materials and manufacturing method used for the colored sections. But recently an inkjet method whereby a plurality of colored sections are formed on a substrate by discharging colored ink from the nozzle of an ink jet head has been proposed (see for example patent publications 1, 2 below).

1. Japanese Unexamined Patent Application, First Publication No. 2000-310706A
2. Japanese Unexamined Patent Application, First Publication No. Hei 11-248926A Here, a method of manufacturing a color filter using a conventional ink jet method is described with reference to the drawings.

FIG. 47 to FIG. 51 are cross-sectional views showing an example of the manufacturing steps for a color filter.

First, as shown in FIG. 47, a black matrix (light shielding layer) 901 made of metal Cr or the like is formed on a substrate 900, and a resist layer 902 which covers the substrate 900 and the black matrix 901 is then formed. The black matrix 901 is formed for example, by the steps of forming a metal Cr film, forming a resist layer, performing exposure treatment, performing etching treatment, and removing the resist layer.

Next, as shown in FIG. 48, a portion of the resist layer 902 is removed by performing exposure treatment and etching treatment on the resist layer 902 to form concave sections 903. The concave sections 903 are partitioned by the substrate 900 and bank sections 904 which represent the remaining sections of the resist layer 902.

Next, as shown in FIG. 49, the R (red) colored sections 905 are formed in the concave sections 903 by discharging colored ink, which is the material which forms the colored sections, from an ink jet head which is not shown in the diagram into a portion of the concave sections 903, and then drying this colored ink.

Next, as shown in FIG. 50, in the same manner as for the R (red) colored sections 905, G (green) colored sections 906 and B (blue) colored sections 907 are sequentially formed in other concave sections 903. Because the colored sections 905, 906 and 907 are separated from other adjacent colored sections by the bank sections 904, the colored sections do not mix with each to form color mixtures.

Finally, as shown in FIG. 51, an over coat layer 908 made of an acrylic resin or an epoxy resin or the like is formed over the colored sections, to obtain the color filter.

However, in the conventional color filter shown in FIG. 51, in order to prevent the colored sections 905, 906, 907 from mixing together, the height of the bank sections 904 must be set to approximately twice the thickness of the colored sections 905, 906, 907, and consequently, a difference in level occurs between the bank sections 904 and the colored sections 905, and the presence of this difference in level makes it difficult to ensure flatness of the over coat layer 908. The over coat layer 908 eventually partitions the cell gap which supports the liquid crystal in the liquid crystal device, and consequently a reduction in the flatness of the over coat layer 908 can lead to unevenness in the spacing of the cell gap, which may adversely affect the contrast ratio or the operating voltage or the like of the liquid crystal device.

Accordingly, in order to ensure the flatness of the over coat layer 908, it is possible to form the over coat layer 908 thickly and fill in the differences in level between the bank sections 904 and the colored sections 905, but if the over coat layer 908 is thick, the overall thickness of the color filter increases, and consequently a problem occurs in that the light transmittance of the color filter is reduced, causing a reduction in the brightness of the liquid crystal device.

In addition, in conventional color filter manufacturing methods, a further problem arises in that in order to form the black matrix 901 and the bank sections 904, the exposure treatment and the etching treatment must each be performed at least twice, and as a result the manufacturing steps tend to become complex.

DISCLOSURE OF THE INVENTION

The present invention takes the above factors into consideration, with an object of providing a color filter which is low cost, has excellent light transmittance, is thin and has excellent flatness.

Furthermore, another object of the present invention is to provide a color filter manufacturing method in which the manufacturing steps can be simplified.

In addition, yet another object of the present invention is to provide a display device comprising an aforementioned color filter, in which there is no irregularity in the contrast ratio and operating voltage, and which has high contrast and good visibility, and to also provide electronic equipment incorporating this display device.

In order to achieve these objects, the present invention employs the following construction.

A color filter of the present invention is a color filter produced by forming a plurality of colored sections on a substrate, wherein a plurality of concave sections are formed in one surface of the substrate, an ink repellant layer is formed between adjacent concave sections, formation sections are formed by the concave sections and the ink repellant layer, and the colored sections are formed in each formation section.

According to this color filter, the colored sections are formed in formation sections partitioned by a thin walled section and the ink repellant layer, meaning that at least a portion of the colored section is embedded in the substrate, enabling the thickness of the colored section regions to be reduced, and consequently it is possible to improve the light transmittance of the color filter.

Furthermore, because at least a portion of the colored section is embedded in the substrate, differences in level between the colored sections and the ink repellant layer can be minimized, and consequently even if the over coat layer which protects the colored sections and the ink repellant layer is formed more thinly than in conventional methods, the flatness of the over coat layer can still be ensured, and the light transmittance of the color filter can be improved by reducing the thickness of the filter.

In addition, because an ink repellant layer which has colored ink repellant properties is formed around the thin walled section, when colored ink is discharged to form the colored sections, there is no danger of the discharged colored ink spreading outside the formation sections, and no danger of adjacent colored sections contacting each other and resulting in color mixing.

Furthermore, a color filter of a mode the present invention is the color filters as disclosed above, wherein at least the upper surface of the ink repellant layer has ink repellant properties, and the formation sections are formed by partitioning by the concave sections and the wall surfaces of the ink repellant layer which are continuations of the wall surfaces of the concave sections.

According to this color filter, because the upper surface of the ink repellant layer has ink repellant properties, even if the colored ink misses its target and is discharged onto the upper surface of the ink repellant layer, the colored ink does not remain on this upper surface and falls into the targeted formation sections, and consequently there is no danger of color mixing occurring between adjacent colored sections.

Furthermore, a color filter of a mode of the present invention is any one of the color filters as disclosed above, wherein the thickness $t_3$ of the colored sections is set to a value less than the combined total $(t_1+t_2)$ of the depth $t_1$ of the concave sections and the layer thickness $t_2$ of the ink repellant layer. The thickness $t_3$ of the colored sections may be set to a value greater than the depth $t_1$ of the concave sections.

According to this color filter, the thickness $t_3$ of the colored sections is set to a value which is less than the combined total $(t_1+t_2)$, which means that the colored sections are provided at a position which is lower than the upper surface of the ink repellant layer, and therefore there is no danger of the discharged colored ink overflowing from the formation sections, and there is no danger of adjacent colored sections contacting each other.

Furthermore, a color filter of a mode of the present invention is any one of the color filters as disclosed above, wherein the thickness $t_3$ of the colored sections is set to a value which is less than the depth $t_1$ of the concave sections.

According to this color filter, because the thickness $t_3$ of the colored sections is set to a value which is less than the depth $t_1$ of the concave sections, the colored sections are always formed inside the concave sections, and the colored sections do not contact the wall surfaces of the ink repellant layer, and consequently the thickness of the ink repellant layer can be even further reduced, making it possible to improve the light transmittance of the color filter by further reducing the thickness of the entire color filter.

Furthermore, a color filter of a mode of the present invention is any one of the color filters as disclosed above, wherein the ink repellant layer is made of an ink repellant transparent photosensitive resin film, and a light shielding layer is formed on the rear surface of the substrate.

The transparent photosensitive resin film functions as a photoresist, and can be processed into a desired pattern by photolithographic techniques, and can consequently be used as a patterning mask when etching the substrate. Furthermore, the transparent photosensitive resin film has excellent light transmittance, and can be adequately exposed even when the film thickness is thick.

Furthermore, a color filter of a mode of the present invention is any one of the color filters as disclosed above, wherein the ink repellant layer is a layered product of an ink repellant transparent photosensitive resin film and a light shielding film.

The transparent photosensitive resin film functions as a photoresist, and can be processed into a desired pattern by photolithographic techniques, and can consequently be used as a patterning mask when etching the light shielding film and the substrate. Furthermore, the transparent photosensitive resin film has excellent light transmittance, and can be adequately exposed even when the film thickness is thick.

Furthermore, a color filter of a mode of the present invention is any one of the color filters as described above, wherein the ink repellant layer is formed of an ink repellant black photosensitive resin film.

The black photosensitive resin film functions as a photoresist, and can be processed into a desired pattern by photolithographic techniques, and can consequently be used as a patterning mask when etching the substrate. Furthermore, this black photosensitive resin film can also be used as a light shielding layer, and consequently it is not necessary to provide a separate light shielding layer, and the thickness of the color filter can be reduced.

Next, a display device of a mode of the present invention is a display device comprising a color filter provided on one of a pair of substrates which oppose each other with a liquid crystal disposed therebetween, wherein a plurality of concave sections are formed in one surface of the substrate, an ink repellant layer is formed between adjacent concave sections, formation sections are formed by the concave sections and the ink repellant layer, and the color filter is formed of a plurality of colored sections formed in each of the formation sections.

Furthermore, a display device of a mode of the present invention is the display device comprising a color filter on one of a pair of substrates which oppose each other with a discharge display section disposed therebetween, wherein a plurality of concave sections are formed in one surface of the substrate, an ink repellant layer is formed between adjacent concave sections, formation sections are formed by the concave sections and the ink repellant layer, and the color filter is formed of a plurality of colored sections formed in each of the formation sections.

According to these display devices, because the colored sections are formed in formation sections partitioned by the concave sections provided in the substrate and the ink repellant layer, the colored sections are at least partially embedded in the substrate, and the thickness of the colored section region can be reduced, and consequently it is possible to improve the brightness of the display device by improving the light transmittance of the color filter.

Furthermore, because the colored sections are at least partially embedded in the substrate, differences in level between the colored sections and the ink repellant layer can be minimized, and consequently even if the over coat layer which protects the colored sections and the ink repellant layer is formed more thinly than in conventional methods, the flatness of the over coat layer can still be ensured, and the light transmittance of the color filter can be improved by reducing the thickness of the filter, thereby improving the brightness of the display device.

In addition, because an ink repellant layer with colored ink repellant properties is formed around the thin walled sections, when colored ink is discharged to form the colored sections, there is no danger of the discharged colored ink spreading outside the formation sections, and there is no danger of adjacent colored sections contacting each other and resulting in color mixing, meaning color bleeding can be prevented.

Furthermore, a display device of a mode of the present invention is any one of the display devices as disclosed above, wherein at least the upper surface of the ink repellant layer has ink repellant properties, and the formation sections are formed by partitioning by the concave sections and the wall surfaces of the ink repellant layer which are continuations of the wall surfaces of the concave sections.

According to this display device, because the upper surface of the ink repellant layer has ink repellant properties, even if the colored ink misses its target and is discharged onto the upper surface of the ink repellant layer, the colored ink does not remain on this upper surface and falls into the targeted formation sections, and consequently there is no danger of color mixing occurring between adjacent colored sections, meaning color bleeding can be prevented.

Furthermore, a display device of a mode of the present invention is any one of the display devices as disclosed above, wherein the thickness $t_3$ of the colored sections is set to a value which is less than the combined total $(t_1+t_2)$ of the depth $t_1$ of the concave sections and the thickness $t_2$ of the ink repellant layer. The thickness $t_3$ of the colored sections may be set to a value greater than the depth $t_1$ of the concave sections.

According to this display device, the thickness $t_3$ of the colored sections is set to a value which is less than the combined total $(t_1+t_2)$, and consequently the colored sections are provided at a position which is lower than the upper surface of the ink repellant layer, and there is no danger of the discharged colored ink overflowing from the formation sections, and there is no danger of adjacent colored sections contacting each other causing color mixing, meaning color bleeding can be prevented.

A display device of a mode of the present invention is any one of the display devices as disclosed above, wherein the thickness $t_3$ of the colored sections is set to a value which is smaller than the depth $t_1$ of the concave sections.

According to this display device, because the thickness $t_3$ of the colored sections is set to a value which is smaller than the depth $t_1$ of the concave sections, the colored sections are always formed inside the concave sections, and because the colored sections do not contact the wall surfaces of the ink repellant layer, the thickness of the ink repellant layer can be further reduced, making it possible to improve the light transmittance of the color filter by reducing the thickness of the entire color filter, and thereby further improve the brightness of the display device.

Furthermore, a display device of a mode of the present invention is any one of the display devices as disclosed above, wherein the ink repellant layer is made of an ink repellant transparent photosensitive resin film, and a light shielding layer is formed on the rear surface of the substrate.

The transparent photosensitive resin film functions as a photoresist, and can be processed into a desired pattern by photolithographic techniques, and can consequently be used as a pattering mask when etching the substrate. Furthermore, this transparent photosensitive resin film has excellent transmittance of visible light, and can be formed on the light shielding layer without impairing the function of the light shielding layer.

Furthermore, a display device of a mode of the present invention is any one of the display devices as disclosed above, wherein the ink repellant layer is a layered product of an ink repellant transparent photosensitive resin film and a light shielding film.

The transparent photosensitive resin film functions as a photoresist, and can be processed into a desired pattern by photolithographic techniques, and can consequently be used as a pattering mask when etching the light shielding layer and the substrate. Furthermore, the transparent photosensitive resin film has excellent light transmittance, and can be adequately exposed even when the film thickness is thick.

Furthermore, a display device of a mode of the present invention is any one of the display devices as disclosed above, wherein the ink repellant layer is formed of an ink repellant black photosensitive resin film.

The black photosensitive resin film functions as a photoresist, and can be processed into a desired pattern by photolithographic techniques, and can consequently be used as a pattering mask when etching the substrate. Furthermore, this black photosensitive resin film can also be used as the light shielding layer, and it is consequently not necessary to provide a separate light shielding layer.

Next, an electronic equipment of the present invention comprises any one of the display devices disclosed above.

Because this electronic equipment comprises a display device described above with an excellent contrast ratio and brightness as the display section, the visibility of the display can be improved Next, a color filter manufacturing method of the present invention comprises a step for forming an ink repellant layer on one surface of a substrate, a step for forming concave sections by patterning the ink repellant layer and etching the exposed substrate, and a step for forming colored sections by discharging colored ink into formation sections formed by the concave sections and the ink repellant layer and then drying this colored ink.

According to this color filter manufacturing method, because the formation sections are provided by etching the substrate exposed by patterning the ink repellant layer, the ink repellant layer surrounds the formation sections, and when colored ink is discharged towards these formation sections, there is no danger of the colored ink spreading outside the formation sections, and adjacent colored sections do not contact each other resulting in color mixing.

Suitable devices for etching the substrate include wet etching using an etching liquid, dry etching such as reactive ion etching, sandblasting, dicing, and laser beam machining and the like. Of these, wet etching is particularly preferred, and an aqueous solution of hydrofluoric acid or a hydrogen fluoride-ammonium fluoride mixed solution or the like can be used as the etching liquid.

Furthermore, a color filter manufacturing method of a mode of the present invention is a manufacturing method as disclosed above, wherein the ink repellant layer is formed of a transparent photosensitive resin film or a black photosensitive resin film, and a plurality of holes are formed by placing a photomask on the transparent photosensitive resin film or the black photosensitive resin film and then exposing and developing the film.

The transparent photosensitive resin film or black photosensitive resin film contains either a positive or a negative photoresist material, and can be processed into a desired pattern by photolithographic techniques, and can consequently be used as a pattering mask when etching the substrate, enabling the manufacturing steps to be simplified. Furthermore, because the black photosensitive resin film also functions as a light shielding layer, it is possible for the formation of the light shielding layer and the formation of the formation sections to be performed simultaneously by forming the plurality of holes and performing the subsequent etching of the substrate, and consequently the manufacturing steps can be further simplified.

Furthermore, a color filter manufacturing method of a mode of the present invention is any one of the manufacturing methods as disclosed above, wherein a light shielding film and a transparent photosensitive resin film are layered sequentially onto the substrate to form the ink repellant layer, a photomask is placed on the transparent photosensitive resin film and a portion of the transparent photosensitive resin film is removed by exposing and developing the transparent photosensitive resin film, and a portion of the exposed light shielding film is then etched, enabling patterning of the ink repellant layer.

The transparent photosensitive resin film contains either a positive or a negative photoresist material, and can be processed into a desired pattern by photolithographic techniques, and can consequently be used as a pattering mask when etching the light shielding film and the substrate, enabling the manufacturing steps to be simplified.

Furthermore, the formation of the light shielding film and the formation of the formation sections can be performed simultaneously by etching the light shielding film and subsequently etching the substrate, enabling the manufacturing steps to be simplified.

BRIEF DESCRIPTION OF THE DRAWINGS

FIG. 29 is a cross-sectional view showing an example of a color filter according to a third embodiment of the present invention.

FIG. 30 is a cross-sectional view showing another example of a color filter according to a third embodiment of the present invention.

FIG. 39A to FIG. 39C are planar schematic drawings showing arrangements of the colored sections of a color filter, wherein FIG. 39A shows a stripe arrangement, FIG. 39B shows a mosaic arrangement, and FIG. 39C shows a delta arrangement.

BEST MODE FOR CARRYING OUT THE INVENTION

As follows is a description of the embodiments of the present invention with reference to the drawings. In FIG. 1 through FIG. 46C, in order for each of the layers and members to be of a recognizable size in the diagrams, the layers and members are not drawn to scale.

[First Embodiment]

A color filter which represents a first embodiment of the present invention and a manufacturing method thereof is described below with reference to the diagrams.

Figure 1:
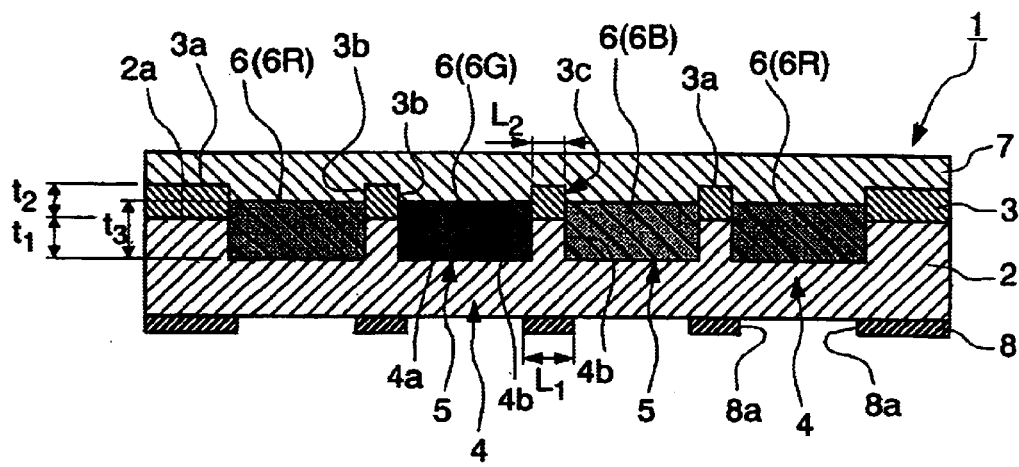
FIG. 1 is a cross-sectional view showing an example of a color filter according to a first embodiment of the present invention.

FIG. 1 is a cross-sectional view showing an example of the color filter according to the first embodiment of the present invention. As shown in FIG. 1, the color filter 1 of the present embodiment comprises a substrate 2, an ink repellant layer 3 formed on one surface 2a of the substrate 2, colored sections 6, an over coat layer 7 which covers the ink repellant layer 3 and the colored sections 6, and a light shielding layer 8. The colored sections 6 are formed by discharging colored ink into formation sections 5 provided across the substrate 2 and the ink repellant layer 3, and then drying the colored ink.

The substrate 2 is a transparent substrate made of glass or plastic film or the like, and a plurality of thin walled sections 4 are provided on a surface 2a thereof in a predetermined pattern. These thin walled sections 4 are formed by providing a plurality of concave sections 4a in the surface 2a of the substrate 2, and the thickness of the sections of the substrate where the thin walled sections 4 are formed is thinner than the thickness of the sections where the thin walled sections 4 are not provided by an amount equivalent to the depth of the concave sections 4a. The depth $t_1$ of the concave sections 4a is preferably within a range from 0.7 to 2 μm, for example.

By being formed between adjacent concave sections 4a, the ink repellant layer 3 is formed at least in the region surrounding the thin walled sections 4 (concave sections 4a), and in FIG. 1 is formed across the entire surface of the surface 2a. This ink repellant layer 3 is formed of a transparent photosensitive resin film, and at least the upper surface 3a thereof displays ink repellant properties. It is preferable that the transparent photosensitive resin film contains at least a fluororesin such as hexafluoropolypropylene and either a positive or a negative photosensitive resin such as those used in normal photoresists for example, and also has excellent light transmittance of the visible light spectrum. The thickness $t_2$ of the ink repellant layer 3 is preferably within a range from 0.5 to 2 μm, for example.

A plurality of holes 3c which link to each of the concave sections 4a are provided in the ink repellant layer 3. The holes 3c are formed such that the wall surfaces 3b thereof are continuations of the wall surfaces 4b of the concave sections 4a. The formation sections 5 are then formed by being partitioned by the thin walled sections 4 (the concave sections 4a) and the wall surfaces 3b of the ink repellant layer 3 (holes 3c).

It is desirable that the ink repellant layer 3 is provided not only on the surface 2a of the substrate 2, but also provided in a similar manner on the upper side in the diagram of the wall surfaces 4b. In this case, the section of the wall surfaces 4b on the lower side in the diagram is preferably lyophilic.

The colored sections 6 are formed in the formation sections 5. As described above, these colored sections 6 are formed by discharging colored ink into the formation sections 5 and then drying the colored ink.

The colored sections 6 comprise red colored sections 6R, green colored sections 6G, and blue colored sections 6B, which correspond with the three primary colors R (red), G (green) and B (blue), respectively. The colored sections 6 are made of an acrylic resin or a polyurethane resin or the like colored by an inorganic pigment, for example.

As shown in FIG. 1, the thickness $t_3$ of the colored sections 6 is set to a value smaller than the combined total value $(t_1 + t_2)$ of the depth $t_1$ of the concave sections 4 and the thickness $t_2$ of the ink repellant layer 3. In FIG. 1, the thickness $t_3$ of the colored sections is greater than the depth $t_1$ of the concave sections 4, but $t_3$ may also be smaller than $t_1$. The thickness $t_3$ of the colored sections 6 is preferably within a range from 1.5 to 3 μm, for example.

Because the colored sections 6 are formed in the formation sections 5 generated by the concave sections 4a and the holes 3c, at least a portion of the colored section is embedded in the substrate 2. Specifically, in the color filter shown in FIG. 1, because the total thickness of the pixel region is reduced by etching the substrate 2 to a depth of $t_1$, it is possible to improve the light transmittance of the color filter 1.

Furthermore, because the colored sections 6 are at least partially embedded in the substrate 2, the difference in level between the colored sections 6 and the ink repellant layer 3 can be minimized, and consequently the flatness of the over coat layer 7 can be ensured even when the over coat layer 7 is formed more thinly than in conventional color filters. Accordingly, it is possible to improve the light transmittance by reducing the thickness of the color filter 1.

Furthermore, because the ink repellant layer 3 which has colored ink repellant properties is formed around the thin walled sections 4, when discharging the colored ink to form the colored sections 6, there is no danger of the discharged colored ink spreading outside the formation sections 5, and no danger of adjacent colored sections 6 contacting each other and resulting in color mixing.

Specifically, because the upper surface of the ink repellant layer 3 has ink repellant properties, even if the colored ink misses its target and is discharged onto the upper surface 3a, the colored ink does not remain on the upper surface 3a and falls into the targeted formation section 5, and consequently there is no danger of color mixing occurring between adjacent colored layers 6.

The light shielding layer 8 is formed on another surface 2b of the substrate 2. A plurality of openings 8a which correspond with the colored sections 6 are provided in the light shielding layer 8 in a predetermined pattern, and each opening 8a is formed in a position corresponding with a colored section 6, or in other words, is formed in a position which overlaps when viewed in a plan view. This light shielding layer 8 is made of metal chromium, a layered product of metal chromium and chromium oxide, or resin black or the like, and the thickness thereof is preferably within a range from 0.1 to 1 µm, for example. The width L1 of the light shielding layer 8 can be set to a value greater than the width L2 of the partition formed between adjacent wall surfaces 4b in the substrate 2.

Furthermore, the over coat layer 7 both protects the colored sections 6 and flattens the surface of the color filter 1, and is made of a transparent resin such as an acrylic resin or an epoxy resin. As described above, the over coat layer 7 can be formed more thinly than in conventional color filters because the difference in level between the colored sections 6 and the ink repellant layer 3 is small, and the thickness thereof can be within a range from 0.5 to 1.5 µm, for example. A transparent electrode film made of an ITO film (indium tin oxide film) or an oriented film may be provided over the over coat layer 6 of the color filter 1.

Because the thickness of the color filter 1 can be reduced by an amount equivalent to the distance by which the colored sections 6 are embedded within the formation sections 5, the light transmittance of the color filter 1 can be improved.

Furthermore, in the color filter 1 described above, because an ink repellant layer 3 with ink repellant properties is formed around the thin walled sections 4, there is no danger of adjacent colored sections 6 contacting each other and resulting in color mixing, and color bleeding between colored sections 6 can be prevented.

Figure 2:
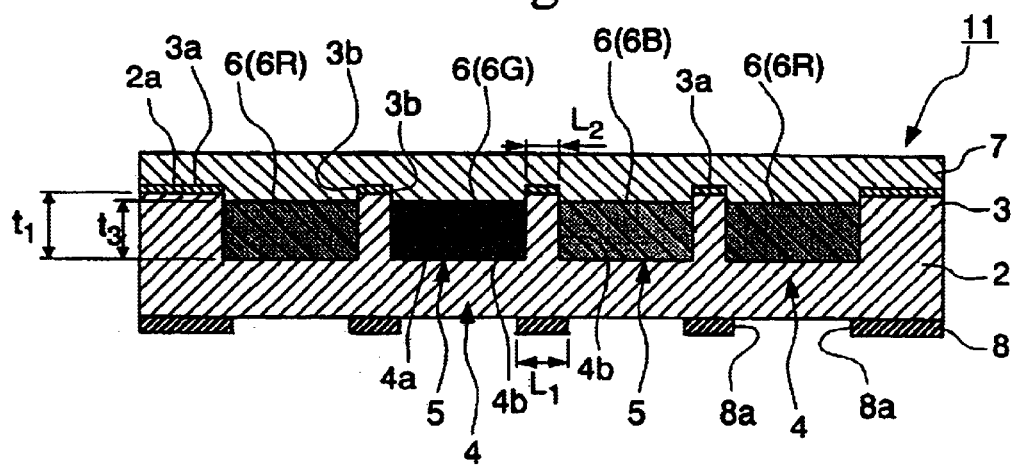
FIG. 2 is a cross-sectional view showing another example of a color filter according to a first embodiment of the present invention.

Furthermore, FIG. 2 shows a color filter 11 of another example of the present embodiment.

In the color filter 11 shown in FIG. 2, the thickness $t_3$ of the colored sections 6 is set to a value which is less than the depth $t_1$ of the concave sections 14. By setting $t_3$ to a value less than $t_1$, the colored sections 6 are always formed within the concave sections 4, and the colored sections 6 do not contact the wall surfaces 3b of the ink repellant layer 3, and consequently the thickness of the ink repellant layer 3 can be reduced, and as a result the light transmittance of the color filter 11 can be further improved by reducing the thickness of the filter.

Next, a manufacturing method of a color filter of the present embodiment is described with reference to FIG. 3 through FIG. 9, using the color filter shown in FIG. 1 as an example.

The manufacturing method of the color filter of the present embodiment comprises an ink repellant layer formation step for forming the ink repellant layer 3 on the surface 2a of the substrate 2, a step for forming the concave sections 4a by patterning the ink repellant layer 3 and etching the exposed substrate 2, and a drying step for forming the colored sections 6 by discharging colored ink into the formation sections 5 formed by the concave sections 4a and the ink repellant layer 3, and then drying this colored ink, wherein the ink repellant layer 3 is formed of a transparent photosensitive resin film.

Figure 3:
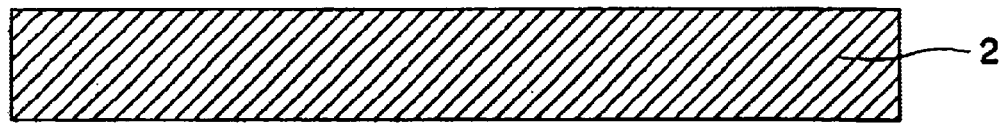
FIG. 3 is a process drawing describing a manufacturing method of the color filter shown in FIG. 1.
Figure 4:
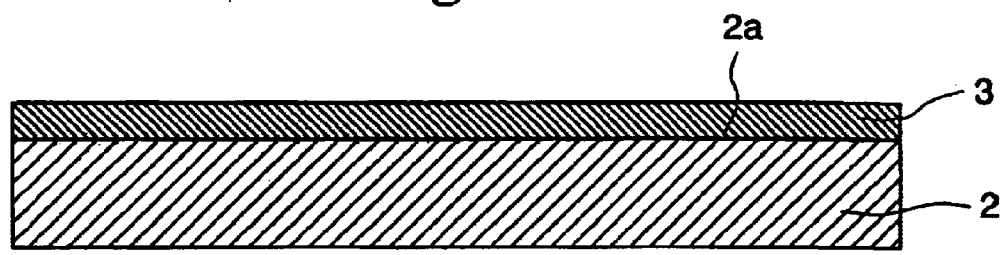
FIG. 4 is a process drawing describing a manufacturing method of the color filter shown in FIG. 1.

First, as shown in FIG. 3, a transparent substrate 2 made of glass or plastic is prepared. Next, as shown in FIG. 4, the ink repellant layer 3 is formed across the entire surface 2a of the substrate 2. This ink repellant layer 3 is made of a transparent photosensitive resin film, and is formed, for example, by applying a resin composition, prepared by dissolving a transparent photosensitive resin in a solvent, onto the surface 2a using a spin coating method or the like, and then performing prebaking to volatilize the solvent. The transparent photosensitive resin film contains a fluororesin such as hexafluoropolypropylene and a negative transparent acrylic photosensitive resin (the photoresist material), for example.

Figure 5:
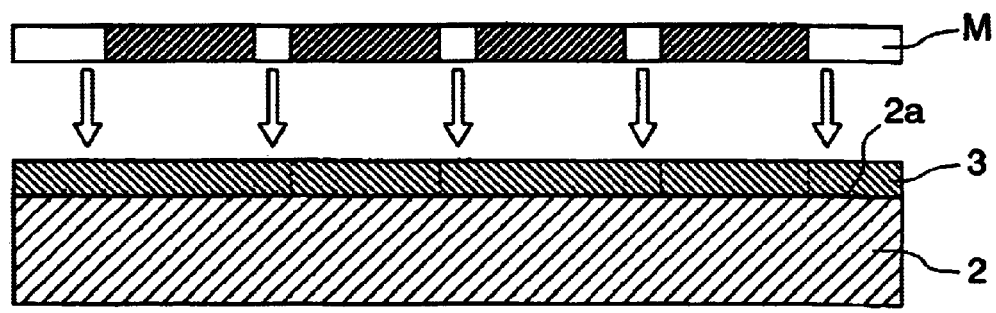
FIG. 5 is a process drawing describing a manufacturing method of the color filter shown in FIG. 1.

Next, as shown in FIG. 5, a photomask film M on which a predetermined matrix pattern has been drawn is placed on the ink repellant layer 3, and is exposed by irradiating ultraviolet light or the like thereon, to cure the exposed portions.

Figure 6:
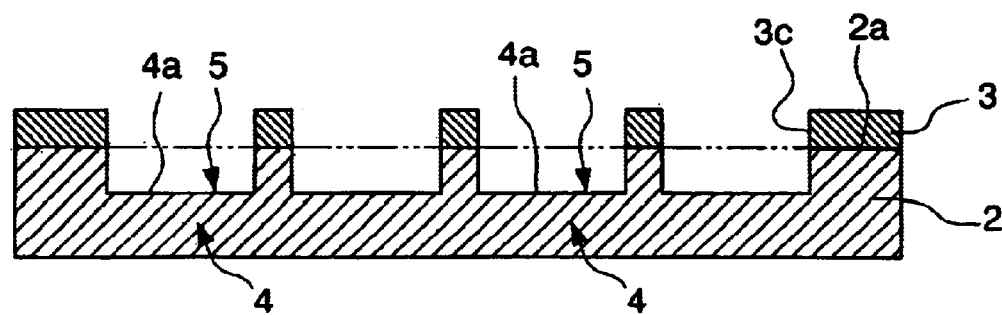
FIG. 6 is a process drawing describing a manufacturing method of the color filter shown in FIG. 1.

Next, as shown in FIG. 6, by immersing the substrate 2 in an alkaline developing solution, for example, to remove the unexposed portions of the ink repellant layer 3, the ink repellant layer 3 is patterned and the holes 3c are formed. It is preferable that after the holes 3c are formed, afterbaking is performed to ensure adequate curing of the ink repellant layer 3.

Next, by immersing the substrate 2 in an etching liquid and etching the exposed substrate 2 through the holes 3c (the sections indicated by the alternate long and two short dashes line in the diagram), the concave sections 4a are provided in the substrate 2 and the thin walled sections 4 are formed. If glass is used as the substrate 2, it is preferable that an aqueous solution of hydrogen fluoride or a mixed aqueous solution of hydrogen fluoride and ammonium fluoride is used as the etching liquid.

In this manner, the formation sections 5 comprising the concave sections 4a (thin walled sections 4) and the linked holes 3c in the ink repellant layer 3 are formed.

Figure 7:
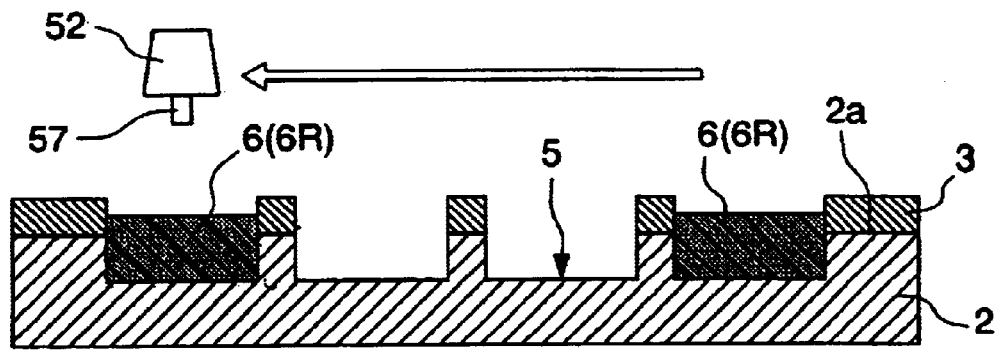
FIG. 7 is a process drawing describing a manufacturing method of the color filter shown in FIG. 1.

Next, as shown in FIG. 7, an ink jet head 52 is filled with a red colored ink prepared by dissolving a red pigment together with an acrylic resin in an organic solvent, a nozzle 57 of the ink jet head 52 is positioned facing the ink repellant layer 3, and while moving the ink jet head 52 and the substrate 2 relative to each other, the red colored ink is discharged from the nozzle 57 as colored ink droplets wherein the volume of each droplet is controlled, and these colored ink droplets are discharged into the formation section 5.

The colored ink used here is prepared, for example, by dispersing a red inorganic pigment in a polyurethane oligomer or a polymethylmethacrylate oligomer, and subsequently adding cyclohexanone and butyl acetate as low boiling solvents and butyl carbitol acetate as a high boiling solvent, and further adding a nonionic surface active agent as a dispersant, to obtain a viscosity which is within a predetermined range.

By drying the discharged colored ink by baking or the like, the red colored sections 6R are formed.

Figure 8:
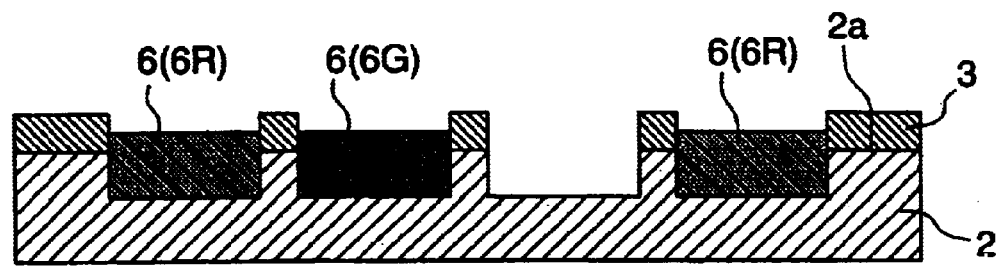
FIG. 8 is a process drawing describing a manufacturing method of the color filter shown in FIG. 1.
Figure 9:
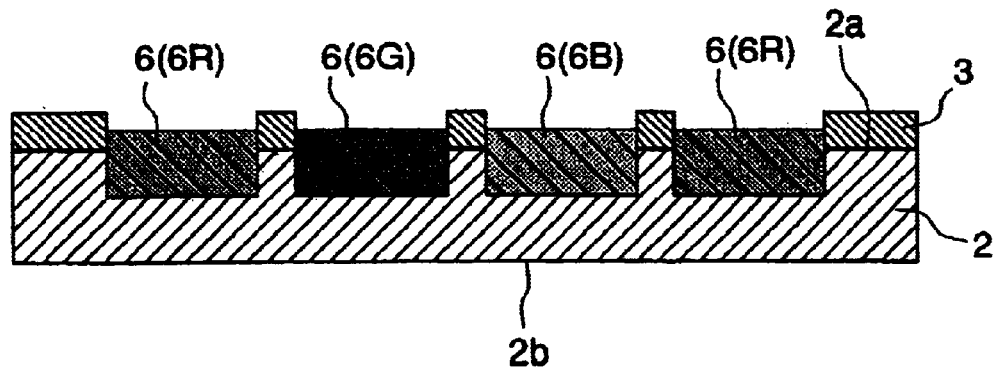
FIG. 9 is a process drawing describing a manufacturing method of the color filter shown in FIG. 1.

Next, in the same manner as in FIG. 7, the green colored sections 6G are formed as shown in FIG. 8, and the blue colored sections 6B are formed as shown in FIG. 9.

Then, by forming the over coat layer 7, which is made of a resin and which covers the colored sections 6 and the ink repellant layer 3, using a spin coating method, and forming the light shielding layer 8 which has a plurality of openings 8a on the other surface 2b of the substrate 2 using photolithographic techniques, the color filter 1 as shown in FIG. 1 is obtained.

Figure 10:
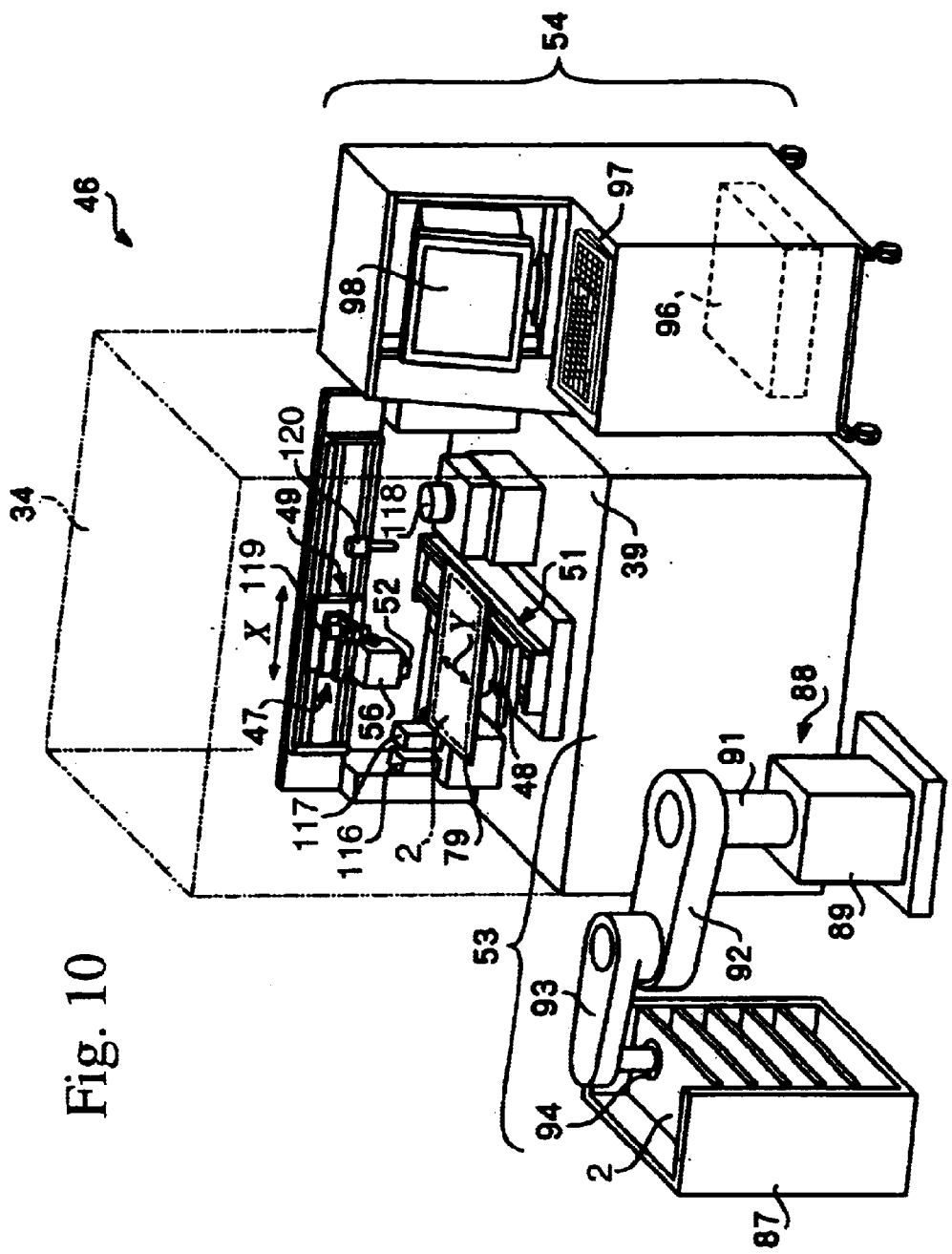
FIG. 10 is a perspective view showing an inkjet device.

FIG. 10 shows an ink jet device, which is an example of a device for performing the discharging of the colored ink, as the color pixel material, as shown in FIG. 7 to FIG. 9.

In FIG. 10, an ink jet device 46 comprises a head unit 56 comprising the ink jet head 52, a head position control device 47 which controls the position of the ink jet head 52, a substrate position control device 48 which controls the position of the substrate 2, a primary scanning drive device 49 for performing primary scanning movement of the ink jet head 52 relative to the substrate 2, a secondary scanning drive device 51 for performing secondary scanning movement of the ink jet head 52 relative to the substrate 2, a substrate supply device 53 which supplies the substrate 2 to a predetermined operating position in the ink jet device 46, and a control device 54 which manages overall control of the ink jet device 46. The head position control device 47, the substrate position control device 48, the primary scanning drive device 49 and the secondary scanning drive device 51 are each installed on a base 39. Furthermore, these devices are covered by a cover 34 as required.

As shown in FIG. 12A, the ink jet head 52 comprises, for example, a plurality of heads 50, six in the present embodiment, and a carriage 55 which acts as a supporting device which supports these heads 50 in a row. The carriage 55 has holes, in other words concave sections, which are slightly larger than the heads 50, in positions where the heads 50 are to be supported, and the heads 50 are inserted into these holes, and fixed in place by screws, an adhesive or other joining devices. Furthermore, if the position of the heads 50 relative to the carriage 55 can be determined accurately, then the heads 50 can simply be press fit into the carriage 55 without using any special joining device.

As shown in FIG. 12B, the heads 50 comprise a nozzle row 58, formed by lining up a plurality of nozzles 57 in a row. The number of nozzles is for example 180, the diameter of the nozzles 57 is for example 28 $\mu$m, and the nozzle pitch between the nozzles 57 is for example 141 $\mu$m (see FIG. 12C). In FIG. 12A, label X indicates the primary scanning direction of the ink jet head 52, and label Y indicates the secondary scanning direction.

By moving parallel to the X direction, the ink jet head 52 scans the substrate 2 in the primary direction, and by selectively discharging ink from the plurality of nozzles 57 in the heads 50 during this primary scanning, colored ink is deposited at predetermined positions in the substrate 2. Furthermore, by moving the ink jet head 52 parallel to the secondary scanning direction Y by a predetermined distance, for example the length $L_0$ of one nozzle row 58 or a multiple thereof, the primary scanning position of the ink jet head 52 can be shifted by a predetermined interval.

The nozzle rows 58 of each of the heads 50 are positioned to lie on a straight line Z when the heads 50 are mounted to the carriage 55. Furthermore, the gap D between adjacent heads 50 is set such that the distance between the nozzles 57 in the endmost positions in an adjacent pair of heads 50 is equal to the length $L_0$ of the nozzle row 58 in an individual head section 50. Such an arrangement of the nozzle row 58 is a measure to simplify the primary scanning in the X direction and the secondary scanning in the Y direction of the ink jet head 52, and the arrangement of the nozzle row 58, that is the arrangement of the heads 50 relative to the carriage 55, may be set in a different manner from the above if desired.

Figure 14A:
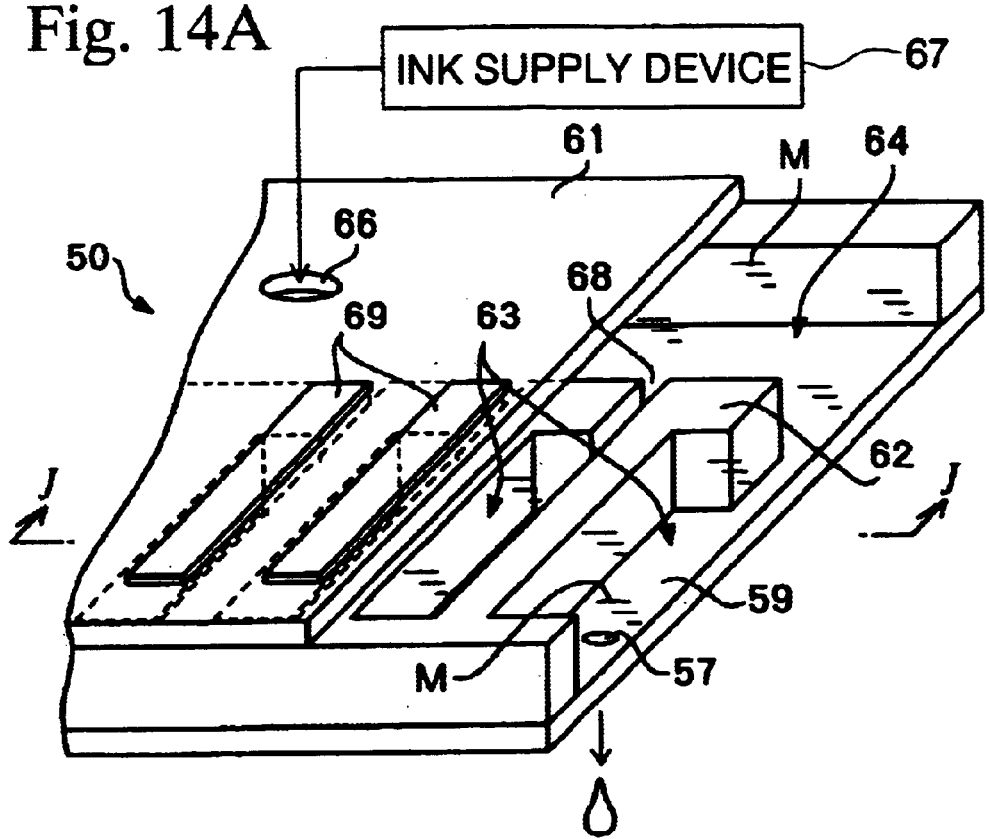
FIG. 14A and FIG. 14B are schematic diagrams showing an internal structure of an ink jet head.
Figure 14B:
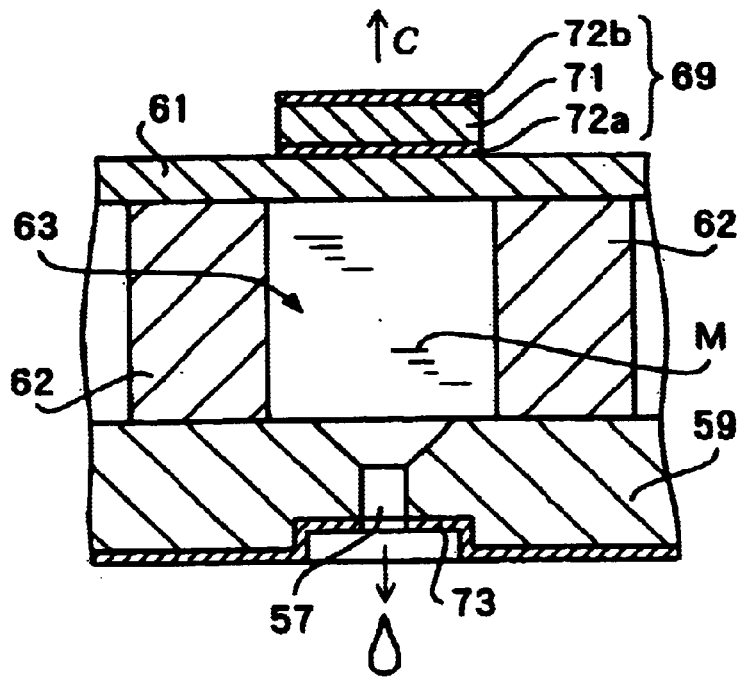

Each individual head section 50 has the internal structure shown in FIG. 14A and FIG. 14B, for example. Specifically, the head section 50 comprises a stainless steel nozzle plate 59, a diaphragm 61 which faces the nozzle plate, and a plurality of partition members 62 which join the nozzle plate 59 and the diaphragm 61 to each other. A plurality of ink chambers 63 and liquid pools 64 are formed between the nozzle plate 59 and the diaphragm 61 by the partition members 62. The plurality of ink chambers 63 and liquid pools 64 are linked together via passages 68. An ink supply hole 66 is formed in a suitable location in the diaphragm 61, and an ink supply device 67 is connected to this ink supply hole 66. This ink supply device 67 supplies colored ink M to the ink supply hole 66. The supplied colored ink M fills the liquid pools 64, and also passes through the passages 68 and fills the ink chambers 63. The colored ink M supplied from the ink supply device 67 is a single color, one of either R, G or B, and a different head section 50 is provided for each individual color.

The nozzle 57 for ejecting the colored ink M from the ink chambers 63 in jet form is provided on the nozzle plate 59. Furthermore, ink pressurizing bodies 69 are mounted to the reverse side of the diaphragm 61 from the surface on which the ink chambers 63 are formed, in positions corresponding with the ink chambers 63. As shown in FIG. 14B, these ink pressurizing bodies 69 comprise a piezoelectric element 71, and a pair of electrodes 72a and 72b on either side of this piezoelectric element 71. Energizing the electrodes 72a and 72b causes the piezoelectric element 71 to bend and deform so as to protrude outward as shown by the arrow C, causing the capacity of the ink chamber 63 to increase. As a result, an amount of the colored ink M equivalent to the amount of the increase in capacity flows from the liquid pool 64, through the passage 68 and into the ink chamber 63.

Next, when the energizing of the piezoelectric element 71 is terminated, the piezoelectric element 71 and the diaphragm 61 both return to their original forms. Consequently, because the ink chamber 63 also returns to its original capacity, the pressure of the colored ink M which is inside the ink chamber 63 rises, and the colored ink M jets from the nozzle 57 towards the substrate 2 as a droplet. In order to prevent flight deviation of the droplet and blocking of the nozzle 57 and the like, an ink repellant layer 73 made of a layer of a Ni-tetrafluoroethylene co-precipitated plate is provided around the periphery of the nozzle 57.

Figure 11:
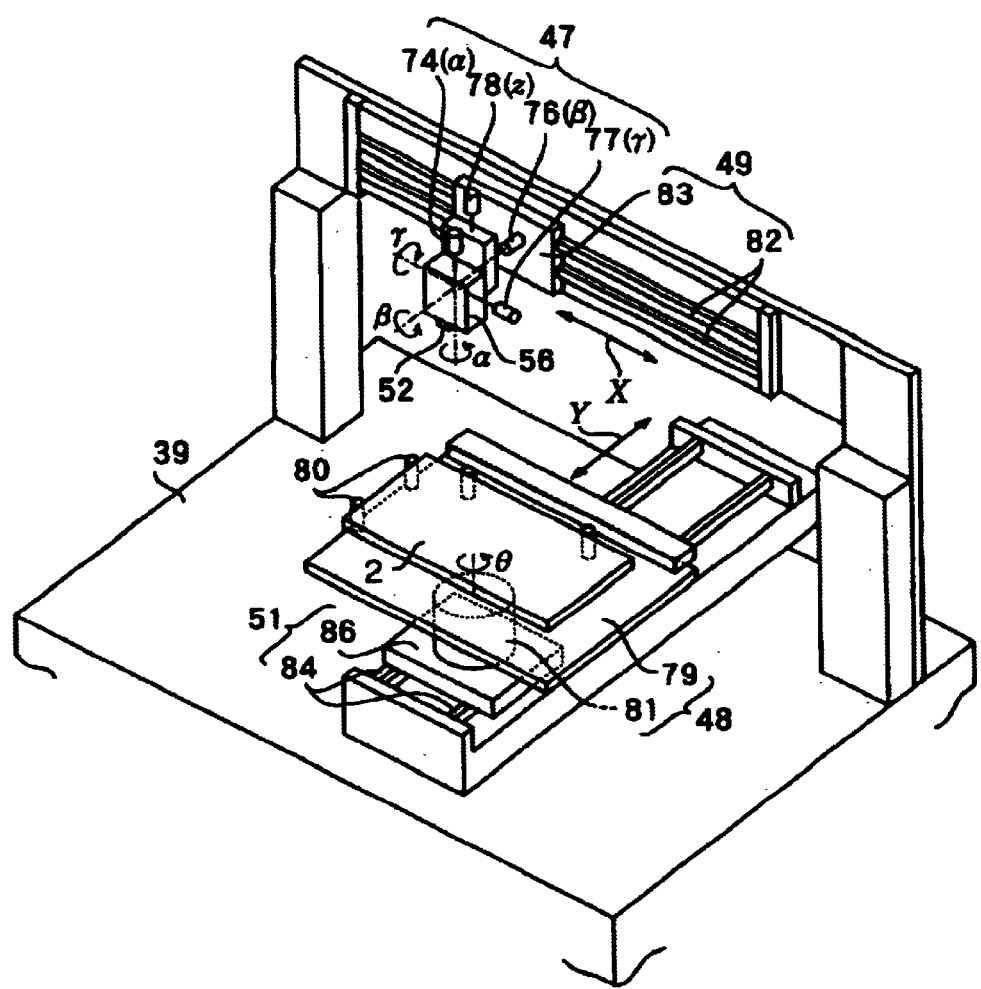
FIG. 11 is a perspective view showing details of a control device for an ink jet head and a substrate.
Figure 12:
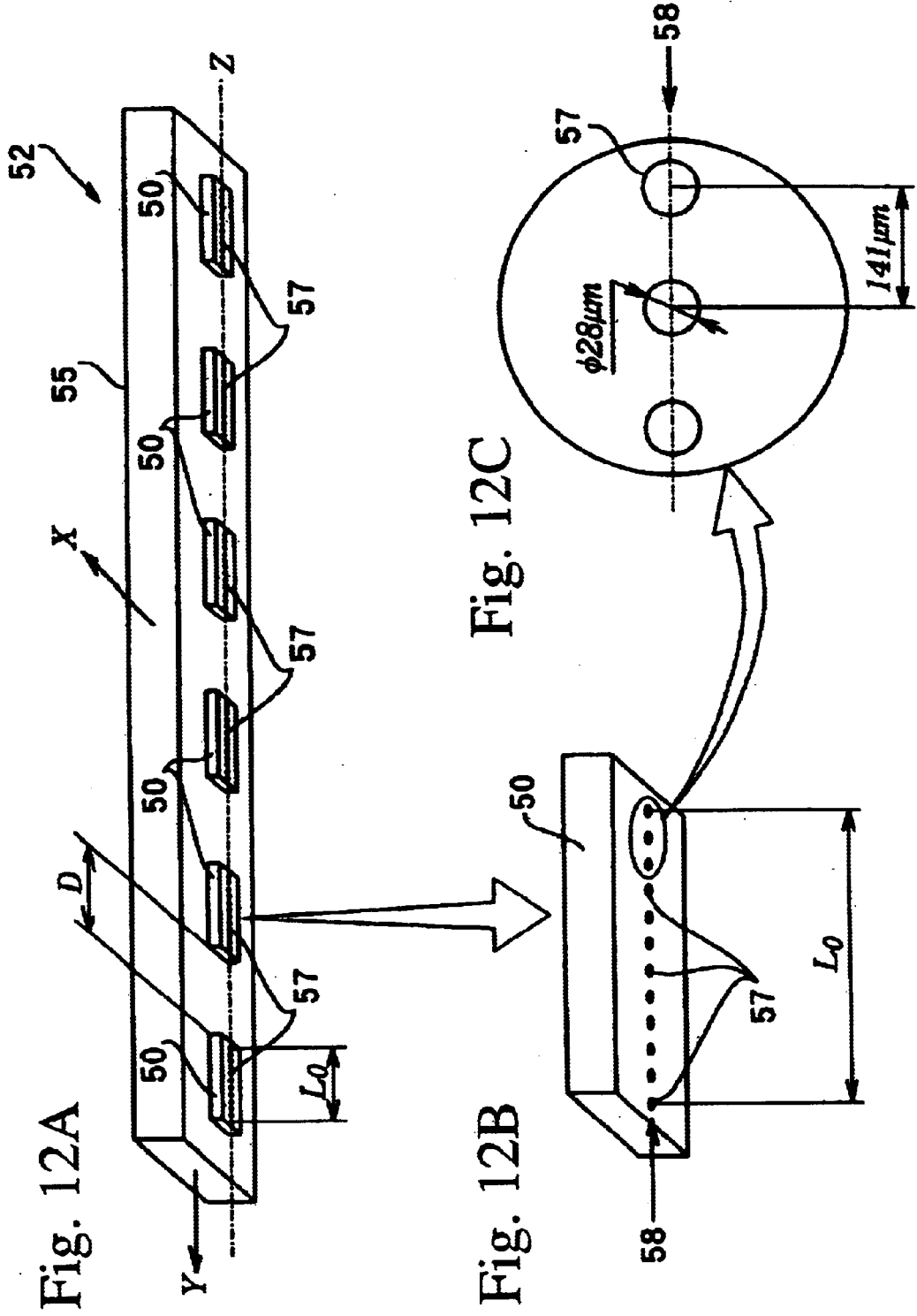
FIG. 12A to FIG. 12C are schematic diagrams showing the ink jet head in detail.

In FIG. 11, the head position control device 47 comprises an $\alpha$ motor 74 for performing in-plane rotation of the ink jet head 52, a $\beta$ motor 76 for performing oscillating rotation of the ink jet head 52 about an axis parallel to the secondary scanning direction Y, a $\gamma$ motor 77 for performing oscillating rotation of the ink jet head 52 about an axis parallel to the primary scanning direction X, and a Z motor 78 for moving the ink jet head 52 up and down.

In FIG. 11, the substrate position control device 48 shown in FIG. 10 comprises a table 79 on which the substrate 2 is placed, and a $\theta$ motor 81 for performing in-plane rotation of the table 79 as shown by the arrow $\theta$. Furthermore, as shown in FIG. 11, the primary scanning drive device 49 shown in FIG. 10 comprises a guide rail 82 extending in the primary scanning direction X, and a slider 83 containing a pulse driven linear motor. When the linear motor in the slider 83 is operated, the slider 83 moves in parallel along the guide rail 82 in the primary scanning direction. Furthermore, as shown in FIG. 11, the secondary scanning drive device 51 shown in FIG. 10 comprises a guide rail 84 extending in the secondary scanning direction Y, and a slider 86 containing a pulse driven linear motor. When the linear motor in the slider 86 is operated, the slider 86 moves in parallel along the guide rail 84 in the secondary scanning direction Y.

Rotation angle control of the output axis of the pulse driven linear motors in the slider 83 and the slider 86 can be performed precisely using a pulse signal supplied to the motor, and accordingly the position in the primary scanning direction X of the ink jet head 52 which is supported by the slider 83 and the position in the secondary scanning direction Y of the table 79, and the like, can be controlled with very high accuracy.

Position control of the ink jet head 52 and the table 79 and the like is not limited to position control using a pulse motor, and can be realized by feedback control using a servo motor, or any other control method.

The substrate supply device 53 shown in FIG. 10 comprises a substrate storage section 87 for storing the substrate 2, and a robot 88 which transports the substrate 2. The robot 88 comprises a base 89 which is placed on an installation surface such as a floor or the ground, a vertical axis 91 which moves vertically relative to the base 89, a first arm 92 which rotates about the vertical axis 91, a second arm 93 which rotates relative to the first arm 91, and a suction pad 94 provided on the bottom surface of the tip of the second arm 93. The suction pad 94 can adhere to the substrate 2 by means of air suction or the like.

In FIG. 10, a capping device 116 and a cleaning device 117 are positioned on one side of the secondary scanning drive device 51 under the trajectory of the ink jet head 52 which is driven by the primary scanning drive device 49 and moves in the primary scanning direction. Furthermore, an electronic force balance 118 is positioned on the other side of the secondary scanning drive device 51. The cleaning device 117 is a device for cleaning the ink jet head 52. The electronic force balance 118 is an instrument which measures the weight of the droplets discharged from each individual nozzle 52 in the ink jet head 52. The capping device 116 is a device which prevents the nozzle 57 from drying out when the ink jet head 52 is in a stand-by state.

A head camera 119 which moves together with the ink jet head 52 is disposed in the vicinity of the ink jet head 52. Furthermore, a substrate camera 120 which is supported by a support device (not shown in the drawing) provided on the base 39 is disposed in a position from which images of the substrate 2 can be taken.

Figure 15:
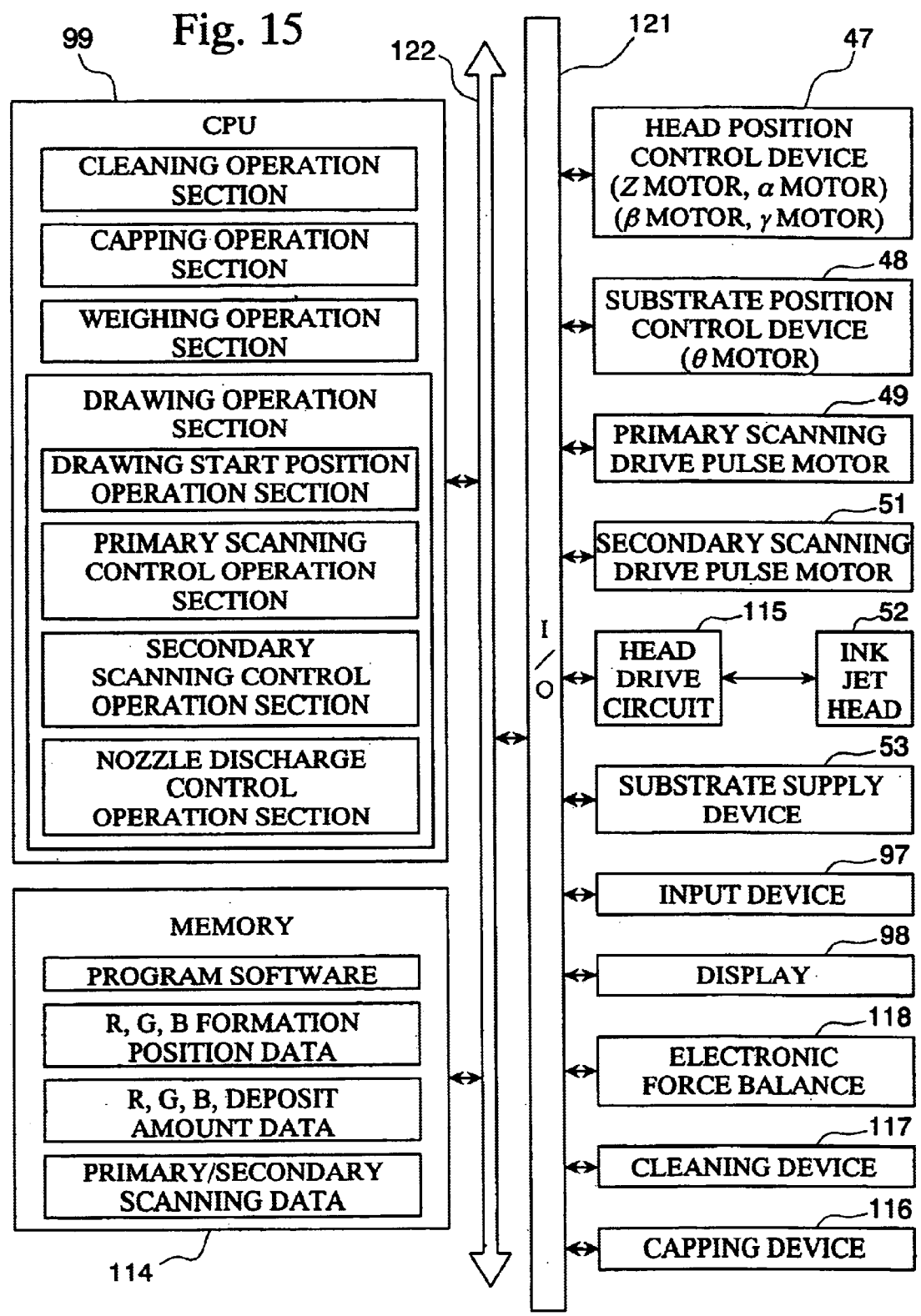
FIG. 15 is a relationship diagram showing a control system of an ink jet device.

The control device 54 shown in FIG. 10 comprises a computer main body 96 which contains a processor, a keyboard 97 for use as an input device, and a CRT (Cathode Ray Tube) display 98 for use as a display device. As shown in FIG. 15, the processor comprises a CPU (Central Processing Unit) 99 which performs arithmetic processing, and a memory which stores a variety of information, or in other words an information storage medium 114.

In FIG. 15, the head position control device 47, the substrate position control device 48, the primary scanning drive device 49, the secondary scanning drive device 51, which are shown in FIG. 10, and a head drive circuit 115 which drives the piezoelectric element 71 in the ink jet head 52 are connected to the CPU 99 via an input/output interface 121 and a bus 122. Furthermore, the substrate supply device 53, the input device 97, the display 98, the electronic force balance 118, the cleaning device 117 and the capping device 116 are also connected to the CPU 99 via the input/output interface 121 and the bus 122. The memory 114 can include semiconductor memory such as RAM (Random Access Memory) and ROM (Read Only Memory), and external storage devices such as hard disks, CD-ROM readers and disc type storage media, and functionally, a storage region for storing program software which describes the control procedure for the operation of the ink jet device 46, a storage region for storing the primary scanning movement amount of the slider 83 in the primary scanning direction X shown in FIG. 11, and the secondary scanning movement amount of the substrate 2 in the secondary scanning direction Y, a region which functions as the work area for the CPU 99 or as a temporary file, and a variety of other storage regions, are established.

Furthermore, program software which regulates the general procedure for forming the color pixels, RGB formation position data which realizes the desired color pixel arrangement, and RGB deposit amount data which regulates the amount of each color material supplied are all stored in the memory 114 shown in FIG. 15. This RGB deposit amount data can be defined in terms of each color, or in terms of a relationship to a coordinate position on the substrate 2.

The CPU 99 in the ink jet device 46 which forms the color pixels computes the timing with which colored ink should be discharged from each of the plurality of nozzles 57 while the ink jet head 52 is scanning in the primary direction, based on the RGB formation position data and the RGB deposit amount data.

The CPU 99 in FIG. 15 controls the discharging of colored ink to predetermined locations on the substrate 2 according to the program software stored in the memory 114, and comprises specifically a cleaning operation section which performs the operations to realize a cleaning process, a capping operation section which realizes a capping process, a weighing operation section which performs the operations to realize a weighing process using the electronic force balance 118 (see FIG. 10), and a drawing operation section which performs the operations required for drawing with the colored ink using the ink jet. Furthermore, further dividing the drawing operation section reveals that the drawing operation section comprises a variety of function operation sections including a drawing start position operation section which sets the ink jet head 52 to an initial position for drawing, a primary scanning control operation section for controlling the scanning of the ink jet head 52 in the primary direction X at a predetermined speed, a secondary scanning control operation section which controls the shifting in the secondary direction Y of the substrate 2 by a predetermined secondary scanning amount, and a nozzle discharge control operation section which performs the operations to control which of the plurality of nozzles 57 in the ink jet head 52 are operated, and with what timing, in order to discharge colored ink.

In the present embodiment, the functions described above are realized by software using the CPU 99, but if these functions can be realized by an independent electronic circuit which does not use a CPU, it is possible to use such an electronic circuit.

Figure 16:
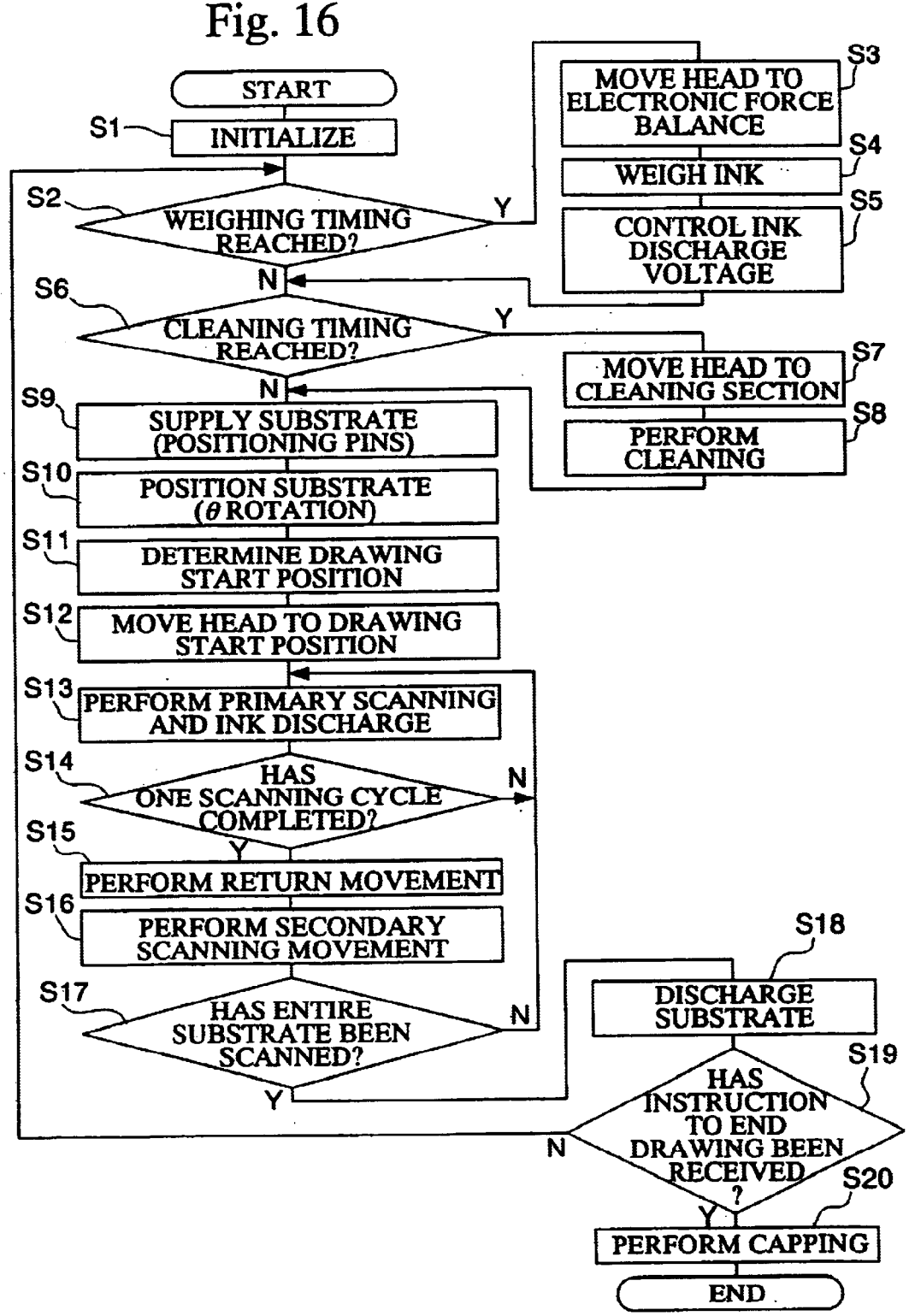
FIG. 16 is a flow chart showing the operation of the ink jet device.

Next, the operation of the ink jet device 46 of the construction described above is described with reference to the flowchart in FIG. 16.

Once the ink jet device 46 starts to operate after being turned on by an operator, first, the ink jet device 46 is initialized in step S1. Specifically, the head unit 56, the substrate supply device 53 and the control device 54 and the like are set to predetermined initial states.

Next, when the weighing timing is reached (YES in step S2), the head unit 56 in FIG. 11 is moved to the location of the electronic force balance 118 in FIG. 10 by the primary scanning drive device 49 (step S3), and the amount of ink discharged from the nozzle 57 is measured using the electronic force balance 118 (step S4). The voltage applied to the piezoelectric element 71 corresponding with each nozzle 57 is then adjusted to suit the ink discharge characteristics of the nozzle 57 (step S5).

Next, when the cleaning timing is reached (YES in step S6), the head unit 56 is moved to the location of the cleaning device 117 by the primary scanning drive device 49 (step S7), and the ink jet head 52 is cleaned by the cleaning device 117 (step S8).

If the weighing timing or the cleaning timing are not reached (NO in step S2 and step S6), or the weighing and cleaning processes have been completed, then the substrate supply device 53 in FIG. 10 is operated and provides the substrate 2 to the table 79 in step S9. Specifically, the substrate 2 in the substrate storage section 87 is held by suction to the suction pad 94, and then the vertical axis 91, the first arm 92 and the second arm 93 are moved to transport the substrate 2 to the table 79, and the substrate 2 is then pushed onto positioning pins 80 (see FIG. 80) which are provided in appropriate positions on the table 79. In order to prevent the substrate 2 from shifting in position on the table 79, it is desirable that the substrate 2 is secured to the table 79 by a device such as air suction.

Next, while observing the substrate 2 using the substrate camera 120 in FIG. 10, the substrate 2 is positioned by performing in-plane rotation of the table 79 in minute angular units by rotating the output axis of the θ motor 81 in FIG. 11 in minute angular units (step S10). Next, while observing the substrate 2 using the substrate camera 119 in FIG. 10, the position from which drawing by the ink jet head 52 is to be started is determined by calculation (step S11), and the ink jet head 52 is moved to the drawing start position by appropriate operation of the primary scanning drive device 49 and the secondary scanning drive device 51 (step S12). At this time, as shown in FIG. 17A and FIG. 17B, the ink jet head 52 is set so that the direction Z in which the nozzle row 58 of each head section 50 extends is at a right angle to the primary scanning direction X.

Once the ink jet head 52 is positioned in the drawing start position in step S12 in FIG. 16, subsequently, primary scanning in the X direction starts in step S13, and the discharging of ink also starts at the same time. Specifically, the primary scanning drive device 49 in FIG. 11 operates and moves the ink jet head 52 in a straight line at a constant speed in the primary scanning direction X shown in FIG. 17A and FIG. 17B, and during this movement, when a nozzle 57 reaches a region where the colored ink should be discharged, colored ink is discharged from the nozzle 57 and embedded within the region. FIG. 17B shows a schematic representation of a state in which the colored ink M is discharged in drop form, in other words in dot form, into regions partitioned by a bank 14.

Figure 17A:
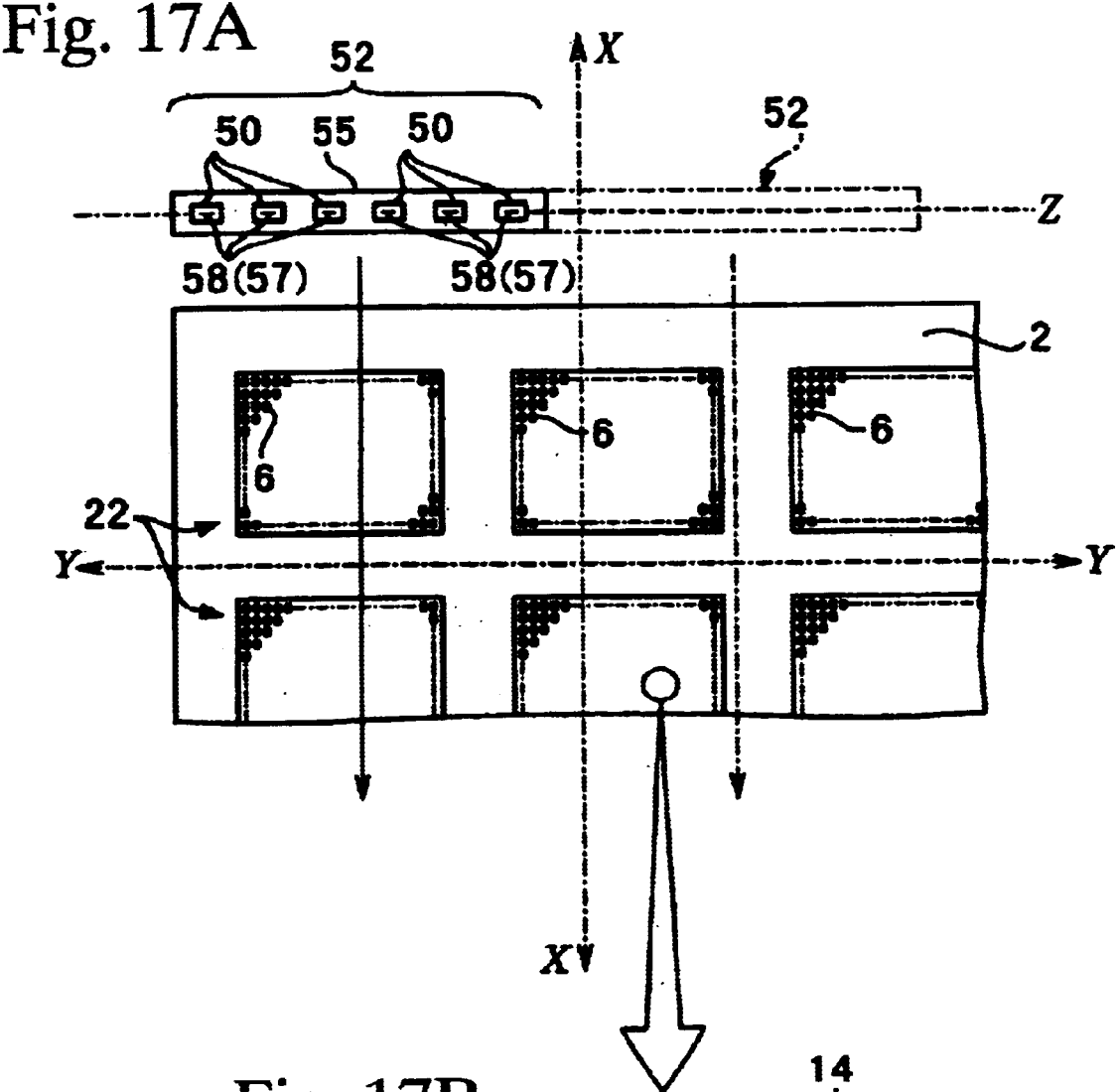
FIG. 17A and FIG. 17B are schematic diagrams showing the principal steps of a color filter formation process.
Figure 17B:
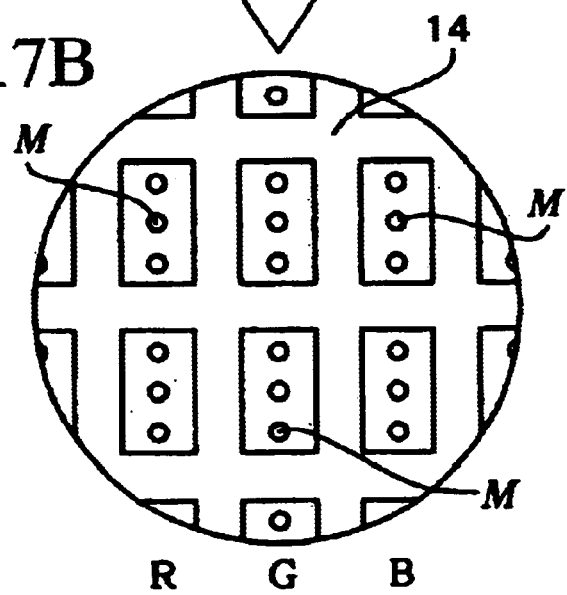

In FIG. 17A, once the ink jet head 52 has completed one primary scan of the substrate 2 (YES in step S14), the ink jet head 52 reverses and returns to the initial position (step S15). Then, the ink jet head 52 is driven by the secondary scanning drive device 51 and moved by a predetermined secondary scanning amount in the secondary scanning direction Y, for example by the length of one nozzle row 58 in one head section 50 or a multiple thereof (step S16). Then, primary scanning and the discharging of ink are repeated, and the colored sections 6 are formed in the formation sections 5 (step S13). It is also possible to omit the return movement in step S15, and perform discharge control in which secondary scanning movement is performed immediately after one primary scanning cycle is completed, and then after the secondary scanning movement is completed, primary scanning is performed in the opposite direction to the primary scanning direction of the previous cycle, with colored ink also being discharged during this reverse primary scanning. In other words, in this case, primary scanning in which ink is discharged is executed during both the forward and reverse movements of the ink jet head 52.

Once the drawing operation of the colored sections 6, performed by the ink jet head 52, has been completed for the entire substrate 2 (YES in step S17), the processed substrate 2 is discharged from the ink jet device using either the substrate supply device 53 or another transportation device. Subsequently, provided there is no command from an operator to end the process (NO in step S19), the process returns to step S2 and the colored ink depositing process is repeated for a different substrate 2.

If there is a command from the operator to end the process (YES in step S19), the CPU 99 causes the ink jet head 52 to be transported to the location of the capping device 116, and the capping process is performed on the ink jet head 52 by this capping device 116 (step S20). Accordingly, the patterning of the colored sections 6 which form the color filter 1 is complete. Subsequently, the first electrode formation step already described in the step P3 of FIG. 9. is executed.

Figure 13:
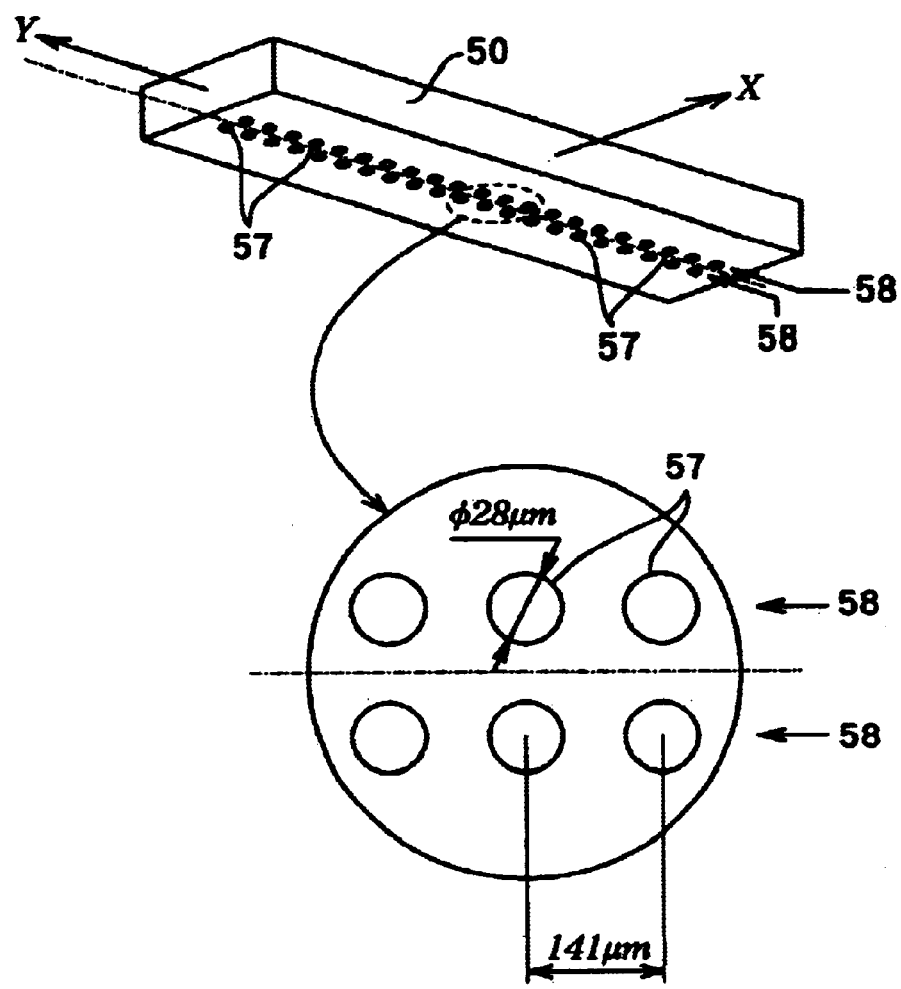
FIG. 13 is a schematic diagram showing another example of an ink jet head.

FIG. 13 shows a modified example of the head section 50 shown in FIG. 12B.

In the head section 50 shown in FIG. 12B, only one nozzle row 58 was provided in the primary scanning direction X. In contrast, in the head section 50 shown in FIG. 13, a plurality of nozzle rows 58, in this case 2 rows, are provided in the primary scanning direction X. If this head section 50 is used, then when the carriage 55 in FIG. 12A performs a primary scan in the X direction, ink can be discharged from two nozzles 57 which lie in a row in this primary scanning direction X, and consequently the methods of controlling the discharge amount of the color pixel material and the protective film material can be diversified.

Figure 18A:
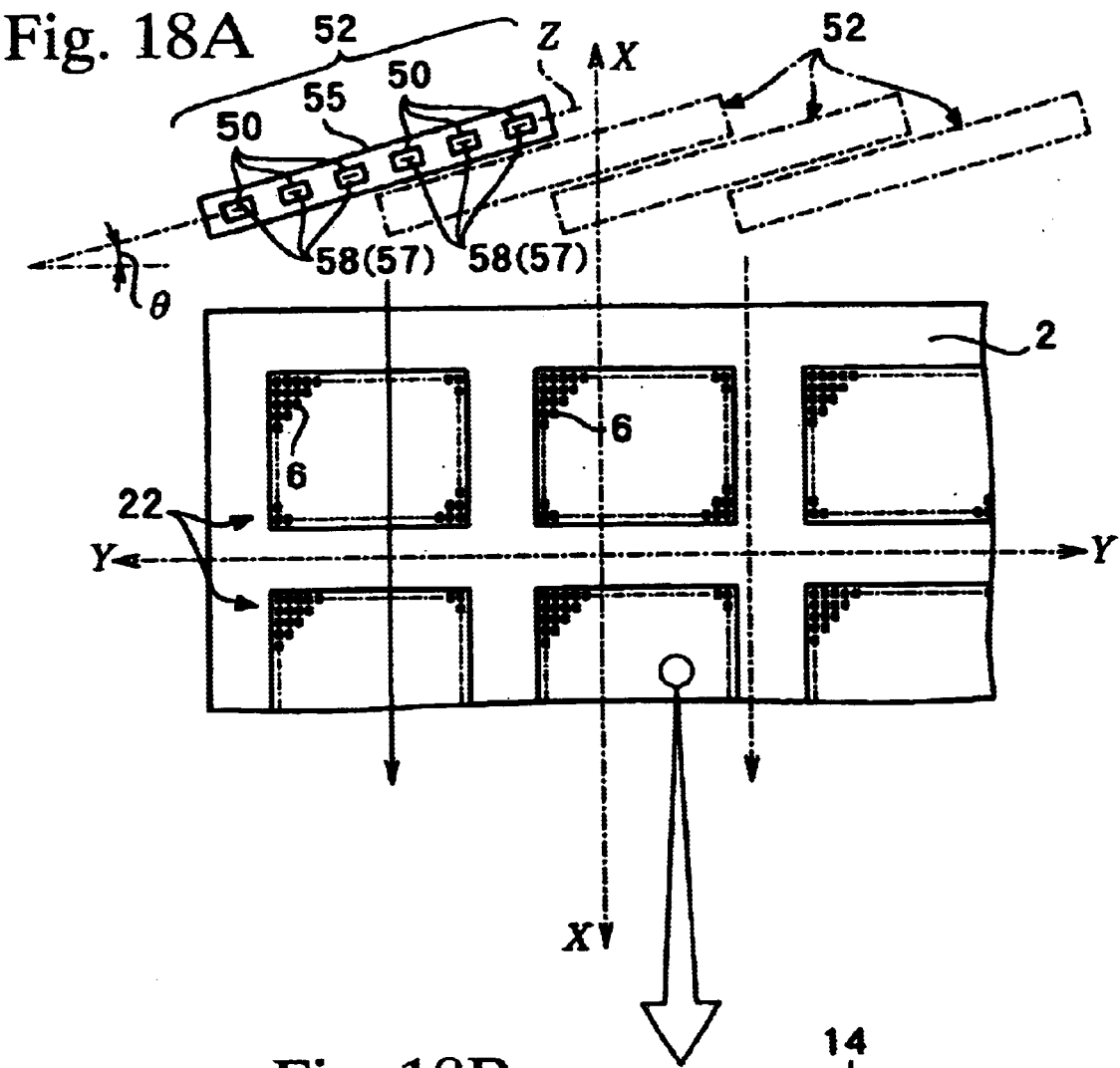
FIG. 18A and FIG. 18B are schematic diagrams showing another principal steps of a color filter formation process.
Figure 18B:
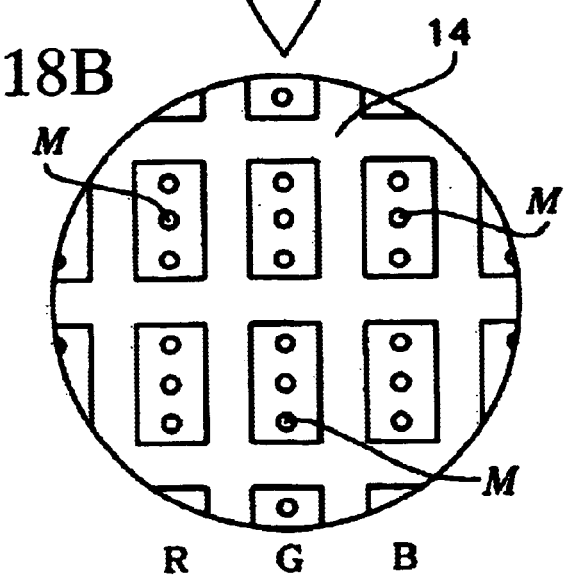

FIG. 18A and FIG. 18B shows another main process of the color filter formation process, and this process is performed instead of the process already described in FIG. 17A and FIG. 17B. The color filter manufactured by this manufacturing method can be the color filter indicated by the labels '1' and '11' in FIG. 1 or FIG. 2.

The point where the process shown in FIG. 18A and FIG. 18B differs from the previous process, as is apparent from a comparison with FIG. 17A and FIG. 17B, is that when the ink jet head 52 is positioned in the initial position relative to the substrate 2, that is the primary scanning start position, then by inclining the entire carriage 55 by an angle θ relative to the secondary scanning direction Y, the direction Z in which the 6 nozzle rows 58 extend is also inclined by an angle θ relative to the secondary scanning direction Y.

By employing this construction, because primary scanning of each head section 50 in the X direction is performed with each head section 50 in an inclined state by an angle θ relative to the secondary scanning direction Y, the nozzle pitch between the plurality of nozzles 57 of each head section 50 can be made equal to the spacing of the formation sections 5 on the substrate 2, in other words the element pitch. If in this manner, the nozzle pitch and the element pitch are made geometrically equal, then conveniently, position control of the nozzle row 58 in the secondary scanning direction Y does not need to be performed.

Figure 19A:
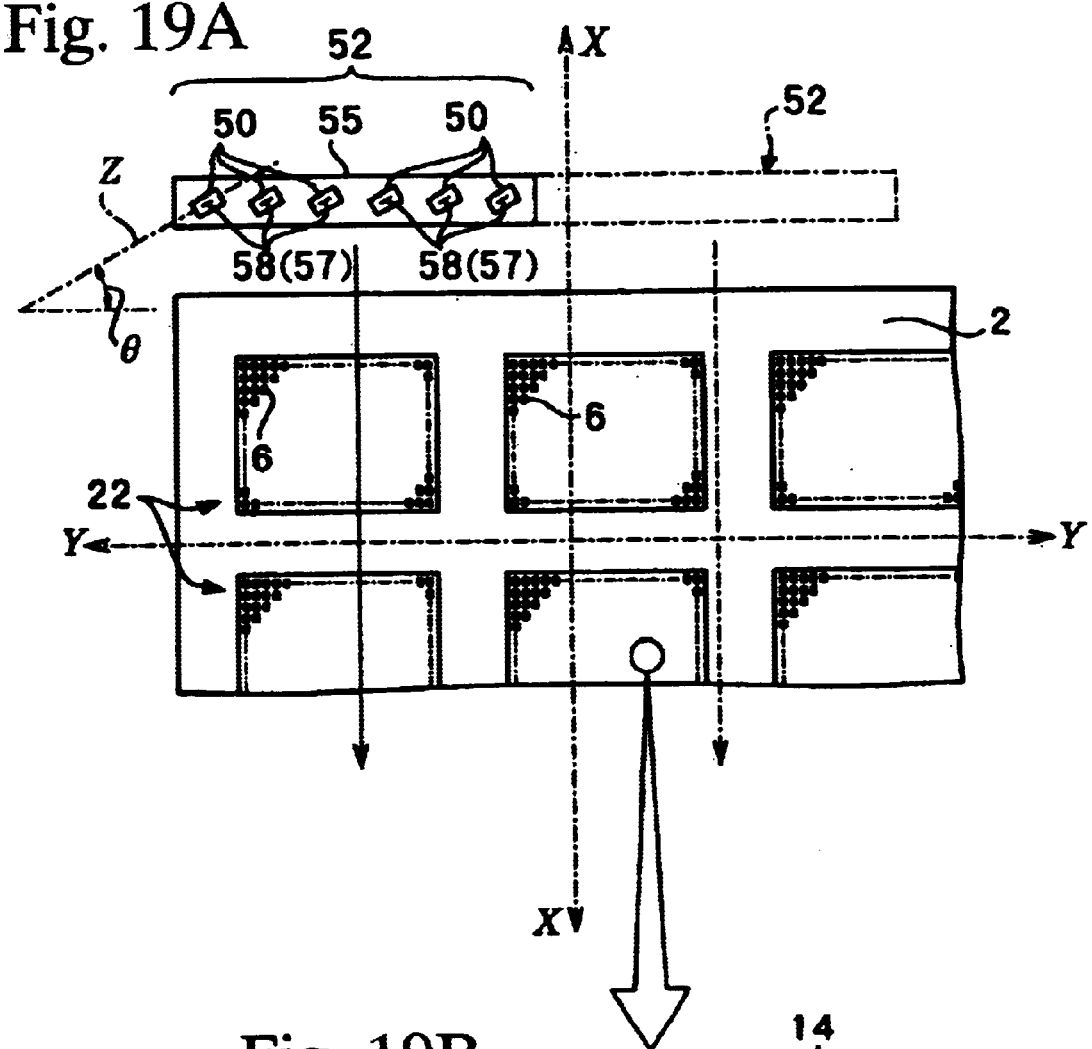
FIG. 19A and FIG. 19B are schematic diagrams showing amother principal steps of a color filter formation process.
Figure 19B:
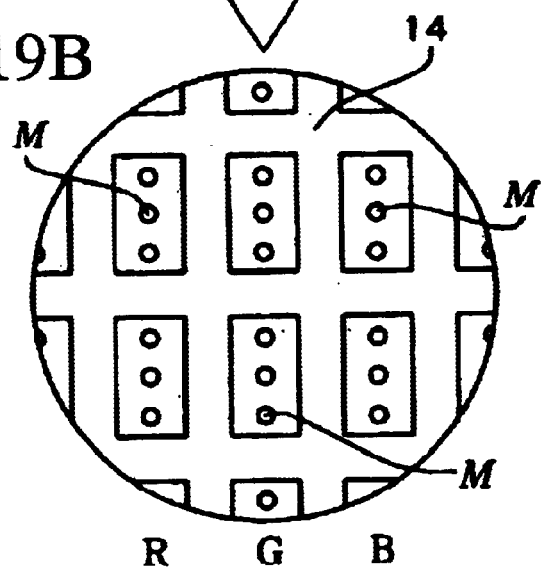

FIG. 19A and FIG. 19B show yet another main process of the color filter formation process, and this process is also performed instead of the process already described in FIG. 17A and FIG. 17B. The color filter manufactured by this manufacturing method can be the color filter indicated by the labels '1' and '11' in FIG. 1 or FIG. 2.

The point where the process shown in FIG. 19A and FIG. 19B differs from the previous process, as is apparent from a comparison with FIG. 17A and FIG. 17B, is that when the ink jet head 52 is positioned in the initial position relative to the substrate 2, that is the primary scanning start position, the entire carriage 55 is not inclined relative to the secondary scanning direction Y, but by inclining the 6 head sections 50 individually by an angle θ relative to the secondary scanning direction Y, the direction Z in which each nozzle row 58 extends is inclined by an angle θ relative to the secondary scanning direction Y.

By employing this construction, because primary scanning by each nozzle row 58 in the X direction is performed in an inclined state by an angle θ relative to the secondary scanning direction Y, the nozzle pitch between the plurality of nozzles 57 belonging to each nozzle row 58 can be made equal to the spacing of the formation sections 5 on the substrate 2, in other words the element pitch. If in this manner, the nozzle pitch and the element pitch are made geometrically equal, conveniently, position control in the secondary scanning direction Y of the nozzle row 58 does not need to be performed. Furthermore, in this case, because each individual head section 50 is inclined instead of inclining the entire carriage 55 as shown in FIG. 18A and FIG. 18B, the distance between the nozzle 57 which is closest to the substrate 2 representing the discharge target and the nozzle 57 which is farthest from the substrate 2 can be markedly smaller than the case shown in FIG. 18A and FIG. 18B, and therefore the primary scanning time in the X direction can be shortened. Consequently, the manufacturing time of the color filter substrate can be shortened.

Figures 39A, 39B, 39C:
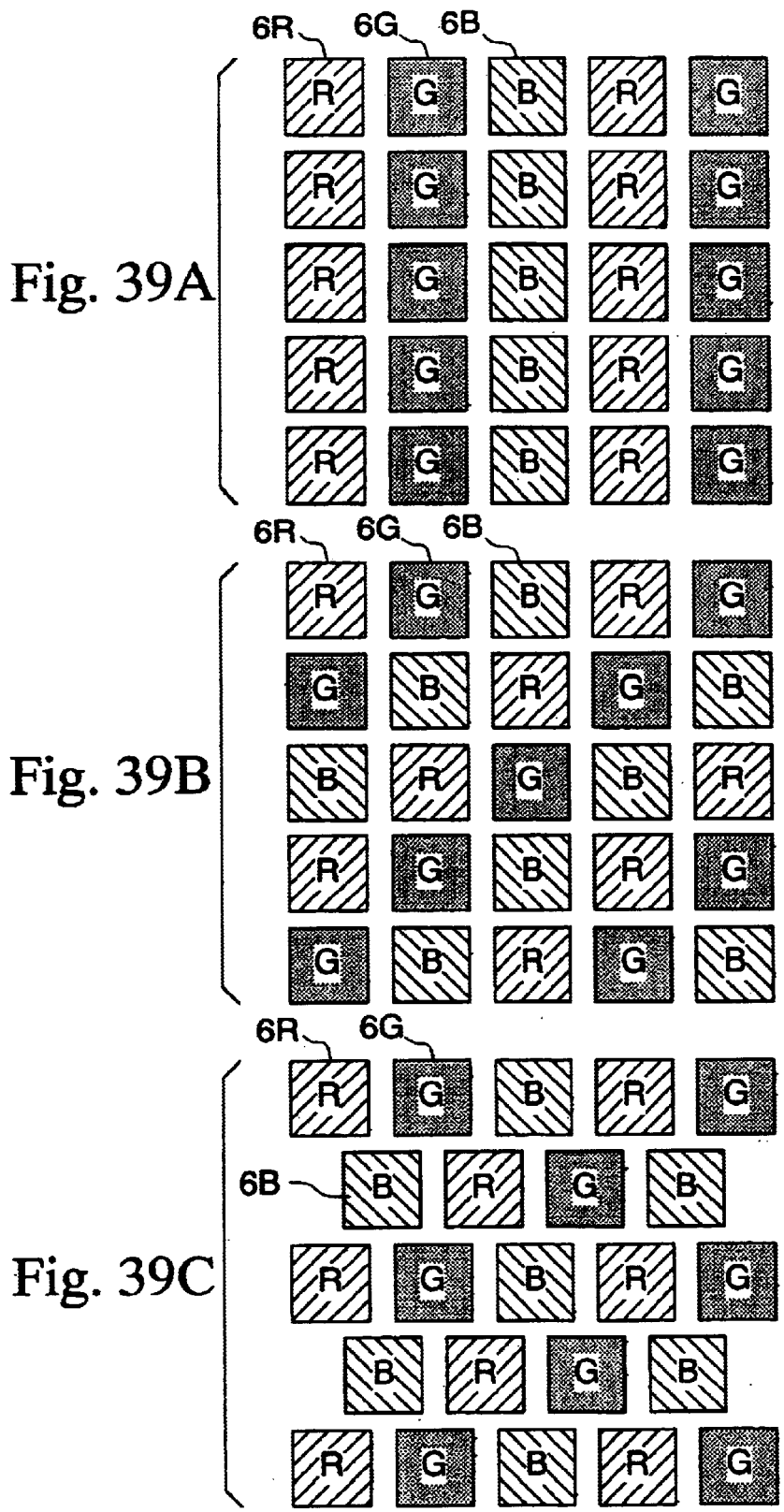

As shown in FIG. 17A, FIG. 17B, FIG. 19A and FIG. 19B, color filters for a plurality of liquid crystal panels 22 can be formed at once on a large substrate 2. Consequently, after forming the color filter, the substrate 2 is typically cut during the manufacturing process and divided into individual liquid crystal panels 22, and subsequent processes are then performed efficiently. Furthermore, as shown in FIG. 39A to FIG. 39C, the arrangement of the colored sections 6 formed in the color filter can be any of a variety of arrangements, such as the stripe array shown in FIG. 39A.

According to the color filter manufacturing method described above, formation sections 5 are provided by etching the substrate 2 which is exposed through a plurality of holes 3c provided in the ink repellant layer 3, and consequently the ink repellant layer 3 surrounds the formation sections 5, and even when colored ink is discharged towards these formation sections 5, there is no danger of the colored ink spreading outside the formation sections 5, and adjacent colored sections 6 do not contact each other resulting in color mixing.

Furthermore, because the transparent photosensitive resin film which forms the ink repellant layer 3 contains a negative photoresist material, and can be processed to a desired pattern by exposure and subsequent developing, the transparent photosensitive resin film can be used as a patterning mask when etching the substrate 2, enabling the manufacturing steps to be simplified.

The formation of the light shielding film may be performed either before or after the color filter manufacturing steps performed using the ink jet. Furthermore, in those cases in which a light shielding film is provided on an opposing electrode substrate, the color filter substrate 2 need not have a light shielding film.

[Second Embodiment]

Next, a color filter and a manufacturing method thereof according to a second embodiment of the present invention are described with reference to the drawings.

Figure 20:
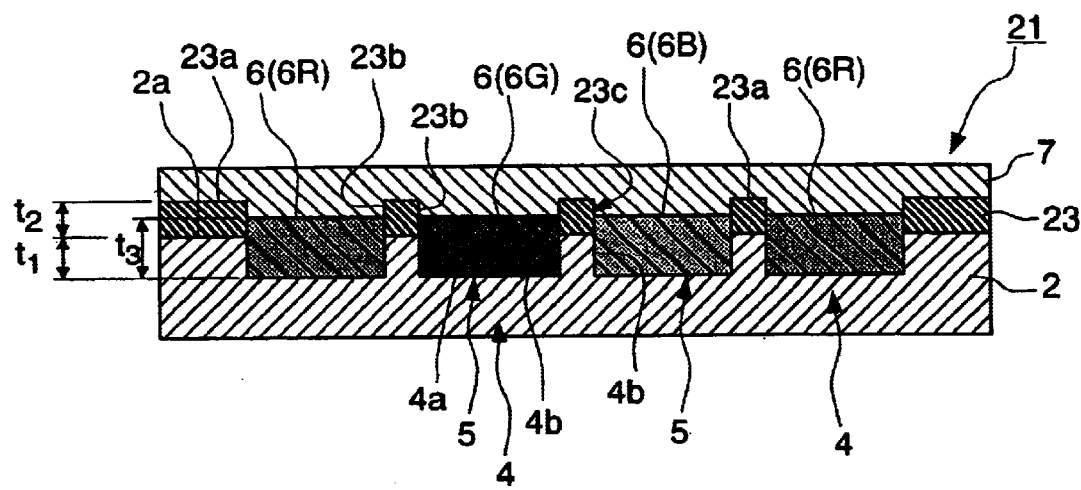
FIG. 20 is a cross-sectional view showing an example of a color filter according to a second embodiment of the present invention.
Figure 21:
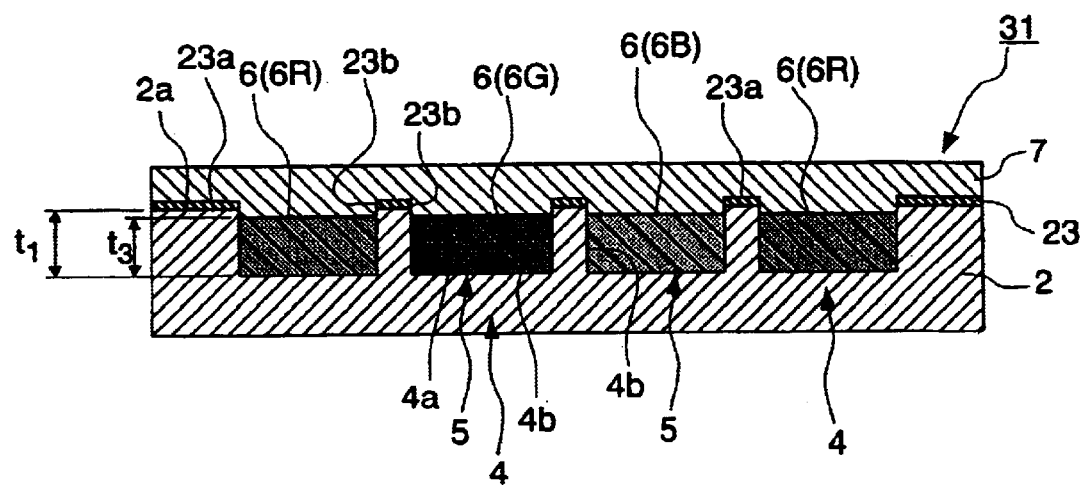
FIG. 21 is a cross-sectional view showing another example of a color filter according to a second embodiment of the present invention.

FIG. 20 is a cross-sectional view showing an example of this second embodiment, and FIG. 21 is a cross-sectional view showing another example of this embodiment. Those structural elements of the color filters shown in FIG. 20 and FIG. 20 which are the same as the structural elements of the color filter of the first embodiment shown in FIG. 1 and FIG. 2 are labeled with the same labels, and any description thereof is omitted.

As shown in FIG. 20, in one example of present embodiment, a color filter 21 comprises mainly a substrate 2, an ink repellant layer 23 formed on a surface 2a of the substrate, colored sections 6, and an over coat layer 7 which covers the colored sections 6 and the ink repellant layer 23, and the thickness $t_3$ of the colored sections 6 is set to value which is less than the combined total value $(t_1+t_2)$ of the depth $t_1$ of the concave section 4 and the thickness $t_2$ of the ink repellant layer 3.

The points in which this color filter 21 differs from the color filters 1, 11 of the first embodiment are the fact that the ink repellant layer 23 is formed of a black photosensitive resin film, and the fact that the light shielding layer 8 which was formed on the other surface 2b of the substrate 2 in FIG. 1 is omitted.

In the same manner as in the first embodiment, the ink repellant layer 23 of this color filter 21 is formed between adjacent concave sections 4a in the region surrounding each thin walled section 4, and in FIG. 20 is formed across the entire surface 2a. This ink repellant layer 23 is formed of a black photosensitive resin film, and at least the upper surface 23a thereof displays ink repellant properties. It is preferable that the black photosensitive resin film contains at least a fluororesin such as hexafluoropolypropylene with ink repellant properties, either a positive or a negative photosensitive resin such as those used in normal photoresists, and a black inorganic pigment such as carbon black or a black organic pigment, for example. The thickness $t_2$ of the ink repellant layer 23 is preferably within a range from 0.1 to 1.5 μm.

A plurality of holes 23c which link to each of the concave sections 4a are provided in the ink repellant layer 23. The holes 23c are formed such that the wall surfaces 23b thereof are continuations of the wall surfaces 4b of the concave sections 4a. Formation sections 5 are then formed by partitioning by the concave sections 4a (thin walled sections 4) and the wall surfaces 23b of the ink repellant layer 23 (holes 23c). The colored section 6 are formed in the formation sections 5.

Because the ink repellant layer 23 contains a black inorganic pigment or organic pigment, and is formed in sections excluding the positions where the colored sections 6 are formed, it blocks the transmission of light between colored sections 6. Accordingly, in addition to having the function of preventing the colored ink from spreading, the ink repellant layer 23 also functions as a light shielding layer.

Consequently, according to the color filter 21 described above, the ink repellant layer 23 can be used as a light shielding layer, and it is not necessary to provide a separate light shielding layer, and consequently the thickness of the color filter 21 can be reduced.

Furthermore, the color filter 21 has the same effect as the color filter 1 of the first embodiment, in that because the thickness of the colored section region can be reduced by an amount equal to the distance by which the colored sections 6 are embedded in the formation sections 5, the light transmittance of the color filter 21 can be improved.

In addition, in the color filter 21 described above, because the ink repellant layer 23 is formed around the thin walled sections 4, there is no danger of adjacent colored sections 6 contacting each other and resulting in color mixing, and color bleeding between colored sections 6 can be prevented.

Furthermore, FIG. 21 shows a color filter 31, which is another example of the present embodiment. In the color filter 31 shown in FIG. 21, the thickness $t_3$ of the colored sections 6 is set to a value which is less than the depth $t_1$ of the concave sections 14. Setting $t_3$ to a smaller value than $t_1$ ensures that the colored sections 6 are always formed within the concave sections 4a, and because the colored sections 6 do not contact the wall surfaces 23b of the ink repellant layer 23, the thickness of the ink repellant layer 23 can be reduced, and consequently the thickness of the color filter 31 can be reduced. In this case, the thickness of the ink repellant layer 23 can be within a range from 0.1 to 1.5 μm.

Next, a color filter manufacturing method of the present embodiment is described with reference to FIG. 22 to FIG. 28, using the color filter 21 shown in FIG. 20 as an example.

The color filter manufacturing method of the present embodiment is substantially the same as the color filter manufacturing method of the first embodiment, with the exception that the ink repellant layer 23 is formed of a black photosensitive resin film, and as such comprises an ink repellant layer formation step in which the ink repellant layer 23 is formed on the surface 2a of the substrate 2, a formation section forming step in which the formation sections 5 are formed, and a drying step in which the colored sections 6 are formed in the formation sections 5. Accordingly, the steps which are the same as in the color filter manufacturing method of the first embodiment are described only in brief.

Figure 22:
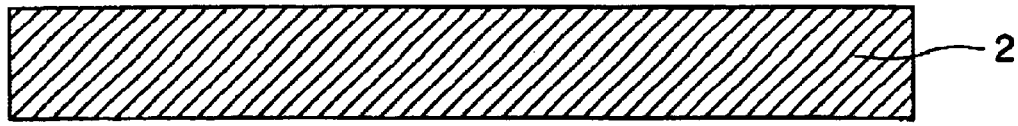
FIG. 22 is a process drawing describing a manufacturing method of the color filter shown in FIG. 20.
Figure 23:
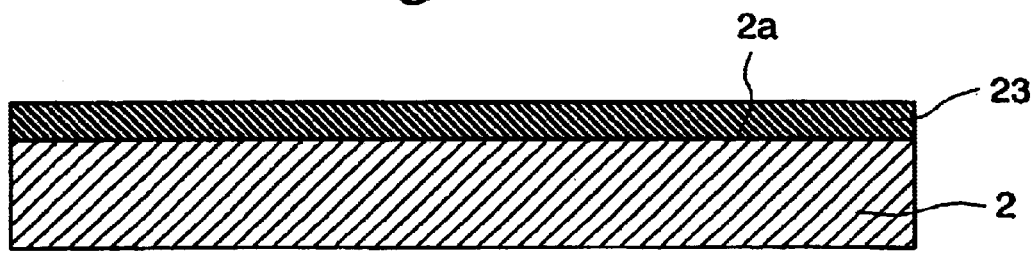
FIG. 23 is a process drawing describing a manufacturing method of the color filter shown in FIG. 20.

First, as shown in FIG. 22, the transparent substrate 2 is prepared, and next, as shown in FIG. 23, the ink repellant layer 23 is formed across the entire surface 2a of the substrate 2. This ink repellant layer 23 is made of a black photosensitive resin film, and is formed, for example, by applying a resin composition, prepared by dissolving a black photosensitive resin in a solvent, onto the surface 2a by a spin coating method or the like, and then performing prebaking of the resulting product to volatilize the solvent. This black photosensitive resin film contains a fluororesin such as polyhexafluoropropylene which demonstrates ink repellant properties, a negative transparent acrylic photosensitive resin (the photoresist material), and a black inorganic pigment such as carbon black or a black organic pigment.

Figure 24:
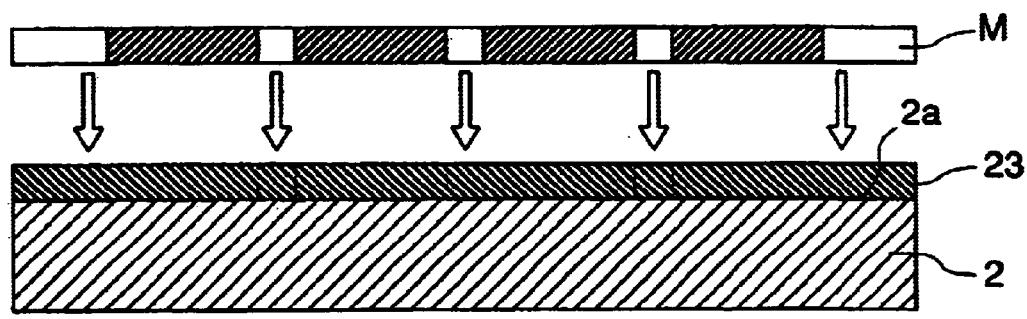
FIG. 24 is a process drawing describing a manufacturing method of the color filter shown in FIG. 20.

Next, as shown in FIG. 24, a photomask film M is placed on the ink repellant layer 23 and exposure is performed to cure the exposed portions.

Figure 25:
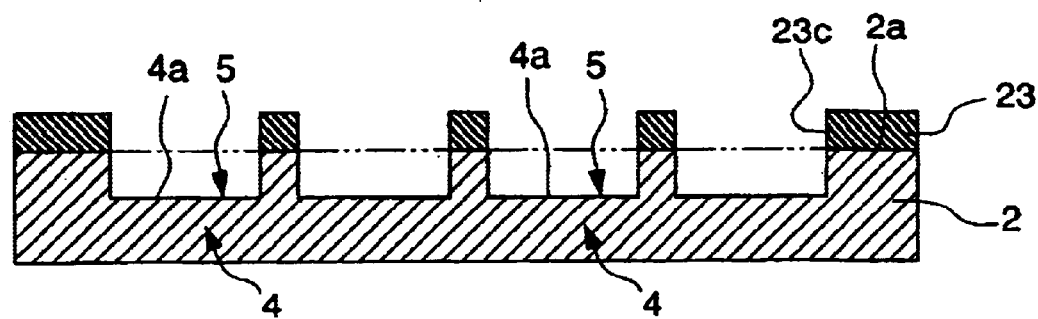
FIG. 25 is a process drawing describing a manufacturing method of the color filter shown in FIG. 20.

Next, as shown in FIG. 25, the holes 23c are formed by immersing the substrate 2 in an alkaline developing solution to remove the unexposed portions. Afterbaking is then performed to ensure adequate curing of the ink repellant layer 23.

Next, by immersing the substrate 2 in etching liquid and etching the substrate 2 (as indicated by the alternate long and short dashed lines in the diagram) to provide the concave sections 4a, the thin walled sections 4 are formed. Specific examples of the etching liquid are the same as for the first embodiment. In this manner, the formation sections 5 comprising the concave sections 4a and the linked holes 23c in the ink repellant layer 23 are formed.

Next, as shown in FIG. 25, the ink jet head 52 is filled with a red colored ink, the discharge nozzles 57 are positioned facing the ink repellant layer 23 and moved relative to the substrate 2, and the red colored ink is discharged from the discharge nozzles 57 into the formation sections 5. By drying the discharged colored ink by baking or the like, the red colored sections 6R are formed. The colored ink used here is the same as the colored ink used in the first embodiment.

Figure 26:
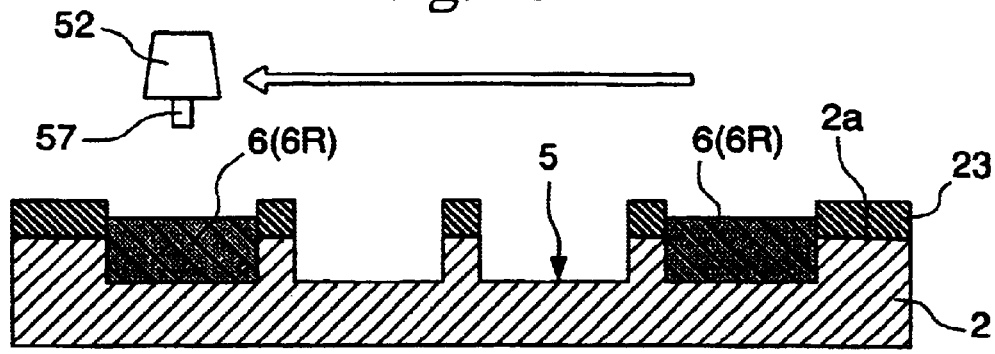
FIG. 26 is a process drawing describing a manufacturing method of the color filter shown in FIG. 20.
Figure 27:
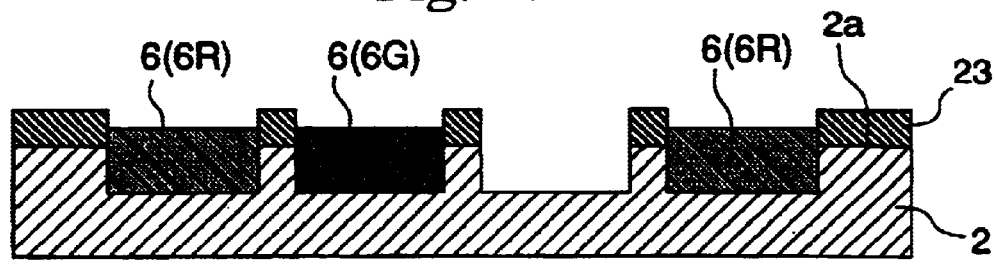
FIG. 27 is a process drawing describing a manufacturing method of the color filter shown in FIG. 20.
Figure 28:
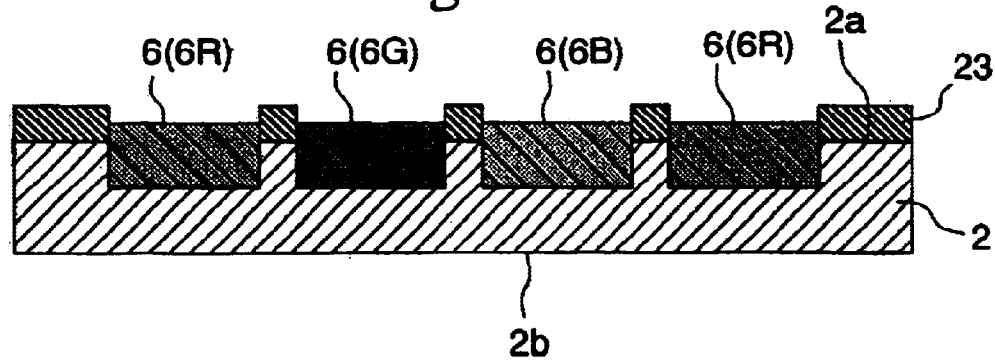
FIG. 28 is a process drawing describing a manufacturing method of the color filter shown in FIG. 20.

Next, in the same manner as in FIG. 26, the green colored sections 6G are formed as shown in FIG. 27, and in addition, the blue colored sections 6B are formed as shown in FIG. 28.

Then, by forming the over coat layer 7, which is made of a resin and covers the colored sections 6 and the ink repellant layer 23, using a spin coating method or the like, the color filter 21 as shown in FIG. 20 is obtained.

This manufacturing method for the color filter 21 has the same effect as the color filter manufacturing method of the first embodiment, in that there is no danger of the colored ink spreading outside the formation sections 5, and adjacent colored sections 6 do not contact each other resulting in color mixing.

In addition, in the manufacturing method of the color filter 21, because the ink repellant layer 23 which is made of a black photosensitive resin film also functions as a light shielding layer, the formation of the light shielding layer and the formation of the formation sections 5 can be completed at the same time by forming the plurality of holes 23c and then performing subsequent etching of the substrate 2.

[Third Embodiment]

Next, a color filter and a manufacturing method thereof according to a third embodiment of the present invention are described with reference to the drawings.

FIG. 29 is a cross-sectional view showing an example of this third embodiment, and FIG. 30 is a cross-sectional view showing another example of this embodiment. Those structural elements of the color filters shown in FIG. 29 and FIG. 30 which are the same as the structural elements of the color filter of the first embodiment shown in FIG. 1 and FIG. 2 are labeled with the same labels, and any description thereof is omitted.

As shown in FIG. 29, the color filter 15 which is one example of the present embodiment comprises mainly a substrate 2, an ink repellant layer 43 formed on a surface 2a of the substrate, colored sections 6, and an over coat layer 7 which covers the colored sections 6 and the ink repellant layer 43, and the thickness $t_3$ of the colored sections 6 is set to value which is less than the combined total value $(t_1+t_2)$ of the depth $t_1$ of the concave section 4 and the thickness $t_2$ of the ink repellant layer 3.

The points in which this color filter 15 differs from the color filter 1 of the first embodiment are the fact that the ink repellant layer 43 is a layered product of a light shielding film and a transparent photosensitive resin film, and the fact that the light shielding layer 8 which was formed on the other surface 2b of the substrate 2 in FIG. 1 is omitted.

In the same manner as in the first embodiment, the ink repellant layer 43 of this color filter 15 is formed in the regions surrounding the thin walled sections 4, and in FIG. 29 is formed across the entire surface 2a. This ink repellant layer 43 comprises a light shielding film 43c layered on the substrate 2, and a transparent photosensitive resin film 43d layered on the light shielding film 43c, and at least the upper surface 43a thereof shows ink repellant properties.

Metal chromium film or a layered product of metal chromium film and chromium oxide film or the like can be used as the light shielding film 43c. Furthermore, the transparent photosensitive resin film 43d is the same substance as the transparent photosensitive resin film described in the first embodiment, and contains a fluororesin such as polyhexafluoropropylene which demonstrates ink repellant properties and either a positive or a negative photosensitive resin such as those used in normal photoresists, and displays excellent light transmittance in the visible light spectrum. The film thickness of the light shielding film 43c is preferably within a range from 0.1 to 0.5 μm, for example, and the film thickness of the transparent photosensitive resin film 43d is preferably within a range from 0.5 to 2.0 μm, for example. The thickness $t_2$ of the entire ink repellant layer 43 is preferably within a range from 0.6 to 2.5 μm.

Furthermore, a plurality of holes 43c which link to each of the concave sections 4a are provided in the ink repellant layer 43. The holes 43c are formed such that the wall surfaces 43b thereof are continuations of the wall surfaces 4b of the thin walled sections 4. Formation sections 5 are formed by being partitioned by the concave sections 4a (thin walled sections 4) and the wall surfaces 43b of the ink repellant layer 43 (holes 43c).

The colored sections 6 are then formed in the formation sections 5.

Although the region in which the light shielding film 43c is formed overlaps with the region in which the transparent photosensitive resin film 43d is formed, because the transparent photosensitive resin film 43d has excellent light transmittance, adequate exposure can be performed even if the film thickness is thick. Furthermore, because the thickness of the substrate 2 in the regions in which the colored sections 6 are formed is thin, photoabsorption by the substrate 2 can be minimized, and consequently it is possible to improve the light transmittance of the color filter 41.

Consequently, according to the color filter 15 described above, the transparent photosensitive resin film 43d displays excellent transmittance of visible light, and consequently even if the transparent photosensitive resin film 43d is formed over the light shielding film 43c, there is no danger of impairing the function of the light shielding film 43c, and spreading of the colored ink can be effectively suppressed by the transparent photosensitive resin film 43d.

In other words, in this color filter 15, the ink repellant layer 43 is formed around the thin walled sections 4, and the transparent photosensitive resin film 43d which displays colored ink repellant properties can be used as the upper surface 43a of this ink repellant layer 43, and there is no danger of the discharged colored ink spreading out over the transparent photosensitive resin film 43d, and consequently there is no danger of adjacent colored sections 6 contacting each other and resulting in color mixing, and color bleeding between colored sections 6 can be prevented.

Furthermore, this color filter 15 has the same effect as the color filter 1 in the first embodiment, in that because the thickness of the colored region can be reduced by the amount by which the colored sections 6 are embedded in the formation sections 5, the light transmittance of the color filter 41 can be improved.

Furthermore, FIG. 30 shows a color filter 16 which is another example of the present embodiment. In the color filter 16 shown in FIG. 30, the thickness $t_3$ of the colored section 6 is set to a smaller value than the depth $t_1$ of the concave sections 14. Setting $t_3$ to a smaller value than $t_1$ ensures that the colored sections 6 are always formed within the thin walled sections 4, and the colored sections 6 do not contact the wall surfaces 43b of the ink repellant layer 43, and consequently the thickness of the ink repellant layer 43 can be reduced, and the thickness of the color filter 16 can be reduced. In this case, the film thickness of the light shielding film 43c should be within a range from 0.1 to 0.3 $\mu$m, the film thickness of the transparent photosensitive resin film 43d should be within a range from 0.5 to 1 $\mu$m for example, and the thickness $t_2$ of the entire ink repellant layer 43 should be within a range from 0.6 to 1.3 $\mu$m.

Next, a color filter manufacturing method of the present embodiment is described with reference to FIG. 31 to FIG. 38, using the color filter 15 shown in FIG. 29 as an example.

The color filter manufacturing method of the present embodiment is substantially the same as the color filter manufacturing method of the first embodiment, with the exception that the ink repellant layer 43 is formed of the light shielding film 43c and the transparent photosensitive resin film 43d, and comprises a step in which the ink repellant layer 43 is formed on the surface 2a of the substrate 2, a step in which the formation sections 5 are formed, and a step in which the colored sections 6 are formed in the formation sections 5. Accordingly, the steps which are the same as in the color filter manufacturing method of the first embodiment are described only in brief.

Figure 31:
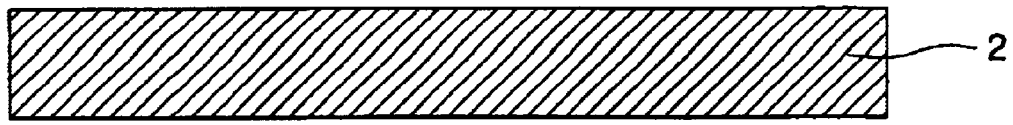
FIG. 31 is a process drawing describing a manufacturing method of the color filter shown in FIG. 29.
Figure 32:
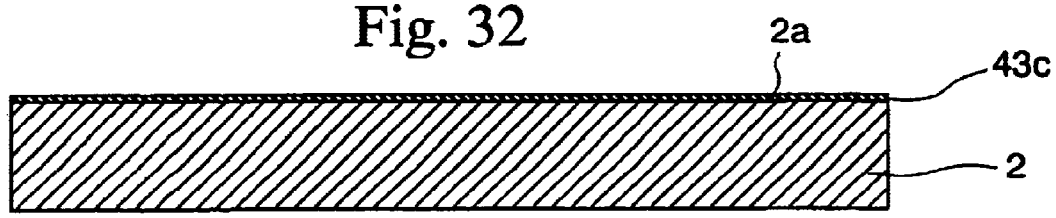
FIG. 32 is a process drawing describing a manufacturing method of the color filter shown in FIG. 29.
Figure 33:
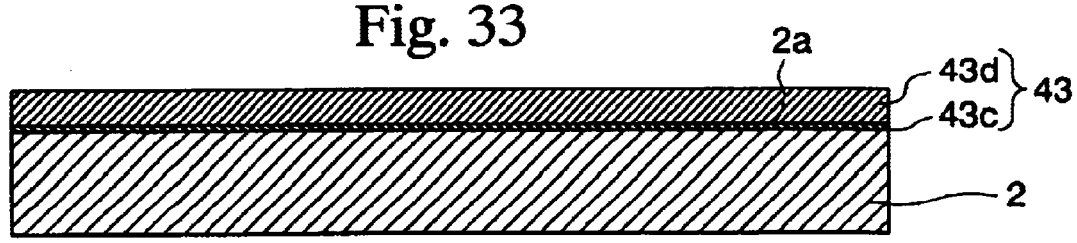
FIG. 33 is a process drawing describing a manufacturing method of the color filter shown in FIG. 29.

First, as shown in FIG. 31, the transparent substrate 2 is prepared, and next, as shown in FIG. 32, the light shielding film 43c is formed across the entire surface 2a of the substrate 2, and the transparent photosensitive resin film 43d is then formed on the light shielding film 43c to obtain the ink repellant layer 43. The light shielding film 43c is formed of metal chromium film, or a layered film of metal chromium film and chromium oxide film, or the like, and is formed using a sputtering technique, for example. Furthermore, the transparent photosensitive resin film 43d is the same substance as the transparent photosensitive resin film which forms the ink repellant layer 3 in the first embodiment, and is formed by applying a film to the surface 2a using a spin coating method and then prebaking the film.

Figure 34:
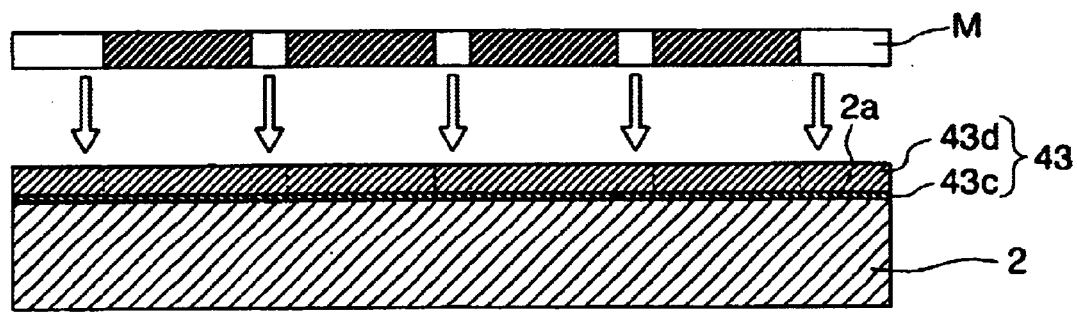
FIG. 34 is a process drawing describing a manufacturing method of the color filter shown in FIG. 29.
Figure 35:
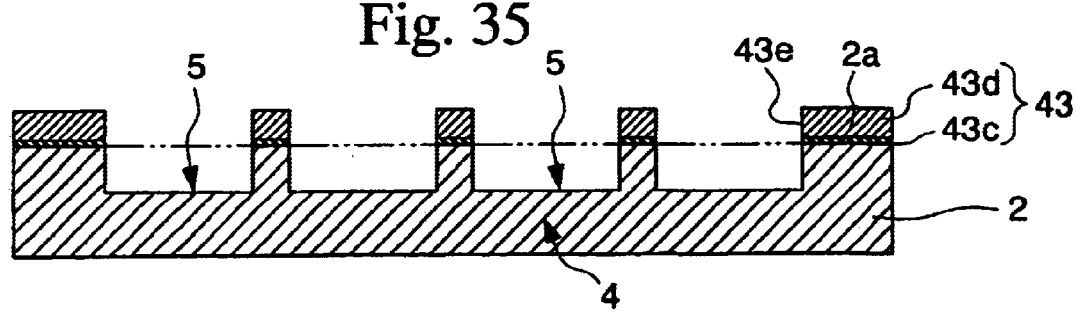
FIG. 35 is a process drawing describing a manufacturing method of the color filter shown in FIG. 29.

Next, as shown in FIG. 34, the photomask film M is placed on the ink repellant layer 43 and exposure is performed to cure the exposed portions of the transparent photosensitive resin film 43d.

Next, as shown in FIG. 25, the holes 43e are formed in the transparent photosensitive resin film 43d by immersing the substrate 2 in an alkaline developing solution to remove the unexposed portions, and the light shielding film 43c is exposed through the holes 43e. Afterbaking is then performed, to ensure adequate curing of the transparent photosensitive resin film 43d.

Next, the substrate 2 is soaked in an etching liquid such as hydrochloric acid, the exposed portions (as indicated by the alternate long and short dashed lines in the diagram) of the light shielding film 43c are etched and the substrate 2 is exposed. Etching liquids other than hydrochloric acid can be used, provided that the etching liquid can selectively dissolve the light shielding film 43c.

Next, the substrate 2 is soaked in a different etching liquid, and the substrate 2 is etched (as indicated by the alternate long and two short dashes line in the diagram) to form the thin walled sections 4. A specific example of an etching liquid which can be used here is the aqueous solution of hydrofluoric acid used in the first embodiment. In this manner, the formation sections 5 comprising the concave sections 4a and the linked holes 3c in the ink repellant layer 43 are formed.

Figure 36:
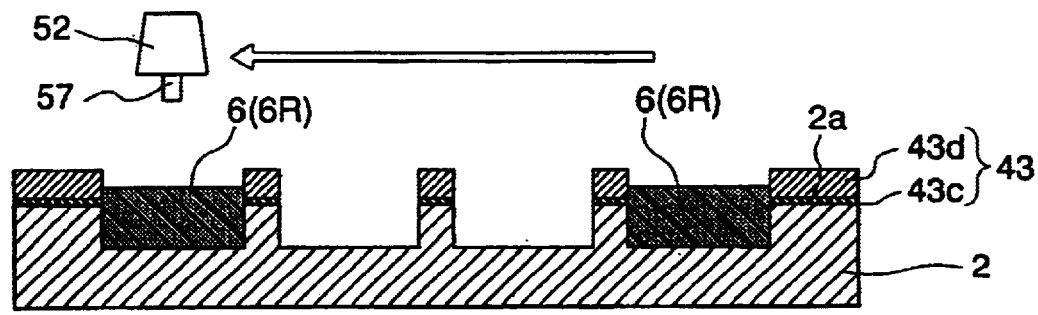
FIG. 36 is a process drawing describing a manufacturing method of the color filter shown in FIG. 29.

Next, as shown in FIG. 36, an ink jet head 60 is filled with a red colored ink, a discharge nozzle 61 is positioned facing the ink repellant layer 43 and moved relative to the substrate 2, and the red colored ink is discharged from the discharge nozzle 61 into the formation sections 5. By drying the discharged colored ink by baking or the like, the red colored sections 6R are formed. The colored ink used here is the same as the colored ink used in the first embodiment.

Figure 37:
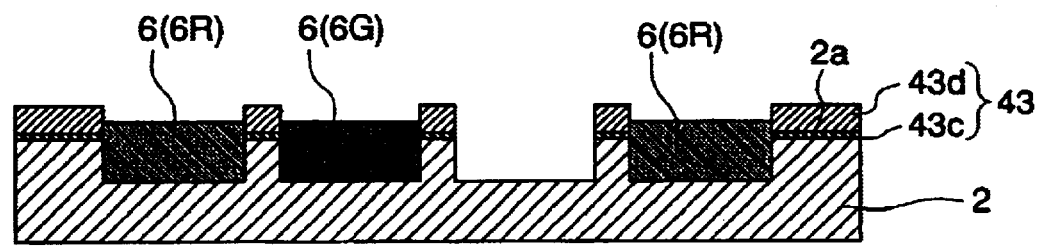
FIG. 37 is a process drawing describing a manufacturing method of the color filter shown in FIG. 29.
Figure 38:
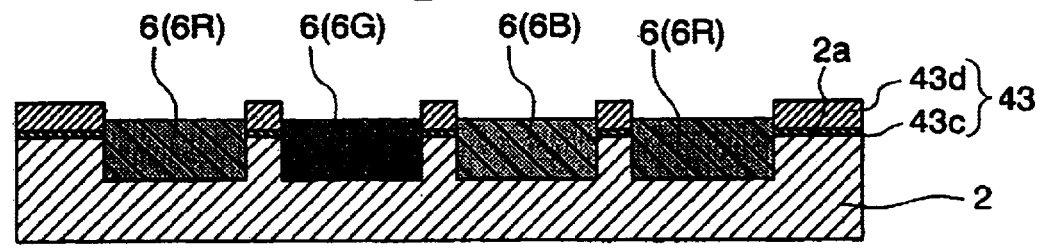
FIG. 38 is a process drawing describing a manufacturing method of the color filter shown in FIG. 29.

Next, in the same manner as in FIG. 36, the green colored sections 6G are formed as shown in FIG. 37, and in addition the blue colored sections 6B are formed as shown in FIG. 38.

Then, by forming the over coat layer 7, which is made of resin and covers the colored sections 6 and the ink repellant layer 43, using a spin coating method or the like, the color filter 15 as shown in FIG. 29 is obtained.

This manufacturing method for the color filter 15 has the same effect as the color filter manufacturing method of the first embodiment, in that there is no danger of the colored ink spreading outside the formation sections 5, and adjacent colored sections 6 do not contact each other resulting in color mixing.

In addition, in the manufacturing method of the color filter 15, because the transparent photosensitive resin film 43d can be processed into a desired pattern by photolithographic techniques, the transparent photosensitive resin film 43d can be used as a patterning mask when etching the light shielding film 43c and the substrate 2, and consequently the manufacturing steps can be simplified.

Furthermore, the formation of the light shielding film 43c and the formation sections 5 can be completed at the same time by etching the light shielding film 43c and then performing subsequent etching of the substrate 2, and consequently the manufacturing steps can be simplified.

A variety of patterns as shown in FIG. 39A to FIG. 39C can be used in the arrangement of the colored sections 6 in the color filters shown in the first, second and third embodiments. A stripe arrangement as shown in FIG. 39A, a mosaic arrangement as shown in FIG. 39B, or a delta arrangement as shown in FIG. 39C can be used, for example.

[Fourth Embodiment]

Next, a liquid crystal device (display device) according to a fourth embodiment of the present invention is described with reference to the drawings.

Figure 40:
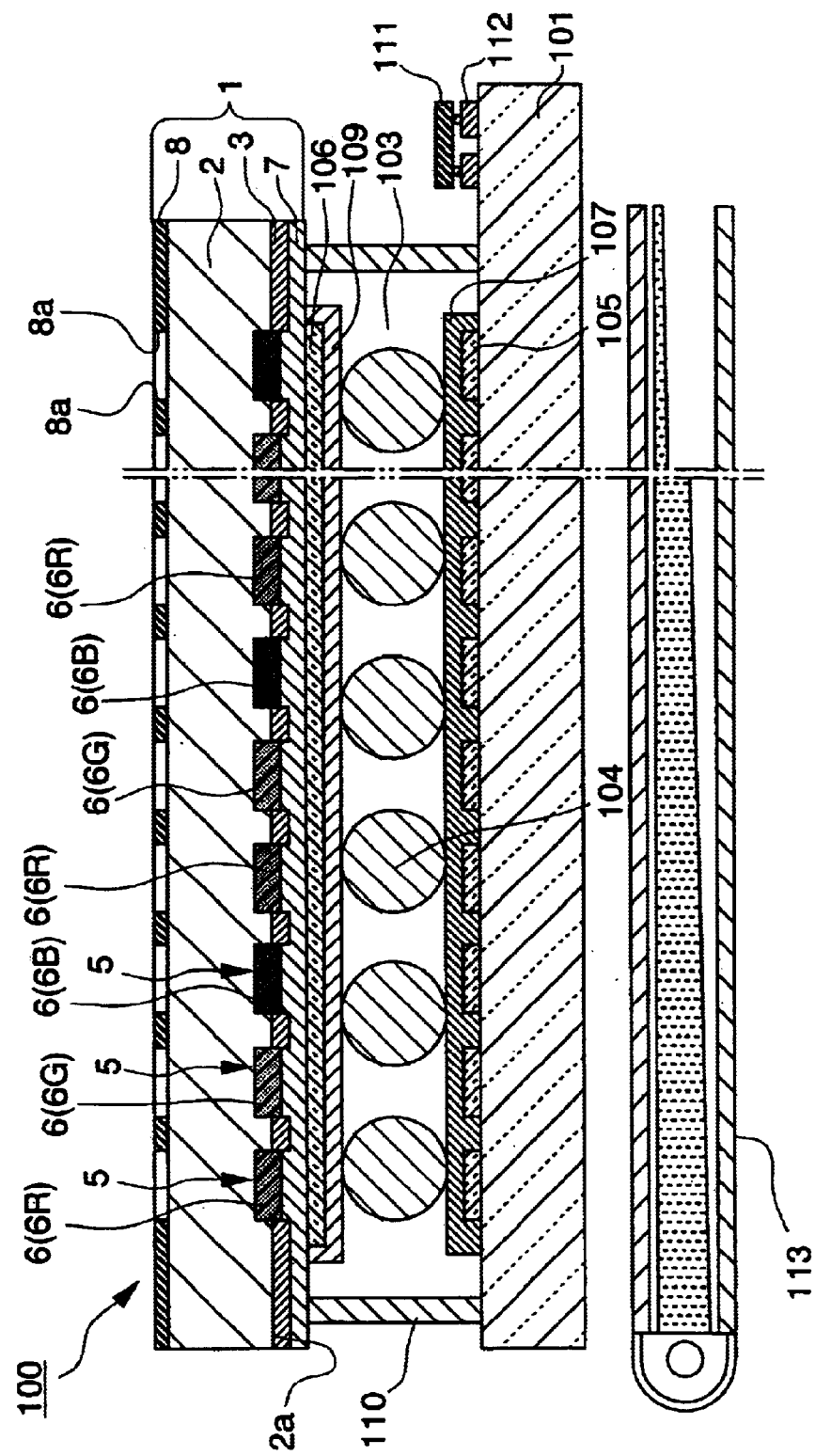
FIG. 40 is cross-sectional view showing the main elements of a liquid crystal device according to a fourth embodiment of the present invention.

FIG. 40 is a cross sectional view showing the general structure of a passive matrix liquid crystal device (liquid crystal device), which represents the fourth embodiment. A transmission type liquid crystal display device is formed as a final product by equipping a liquid crystal device 100 according to this embodiment with accessories such as a liquid crystal drive IC 111, wiring 112, a light source (backlight) 113, and a support which is not shown in the diagram.

This liquid crystal device 100 comprises the color filter 1 described in the first embodiment as the color filter, and the color filter 1 is provided on the upper side (the side facing the observer). In the present embodiment, the color filter 1 will be described only in brief.

FIG. 40 shows the main elements of the transmission type liquid crystal device 100, and in the basic structure of this liquid crystal device 100, a liquid crystal layer 103 made of a STN (Super Twisted Nematic) liquid crystal or the like is provided between the color filter 1 and a substrate 101 made of a glass substrate or the like. Furthermore, a sealing material 110 is provided between the outside edges of the color filter 1 and the outside edges of the substrate 101, and the section partitioned by the color filter 1, the substrate 101 and the sealing material 110 is filled with the liquid crystal layer 103.

The color filter 1 is the same as the color filter described in the first embodiment, and comprises a substrate 2, an ink repellant layer 3 formed on one surface 2a of the substrate, colored sections 6, an over coat layer 7 which covers the ink repellant layer 3 and the colored sections 6 and a light shielding layer 8. The colored sections 6 comprise red (R) colored sections 6R, green (G) colored sections 6G and blue (B) colored sections 6B.

A plurality of electrodes 106 are formed in a stripe formation at predetermined intervals beneath the over coat layer 7 (on the side facing the liquid crystal layer 103) of the color filter 1, and an oriented film 109 is formed beneath the electrodes 106 (on the side facing the liquid crystal layer 103).

In the same manner, a plurality of electrodes 105 which extend in a direction orthogonal to the electrodes 106 on the color filter are formed in a stripe formation at predetermined intervals on the surface of the substrate 101 which faces the color filter 1, and an oriented film 107 is formed on top of the electrodes 105 (on the side facing the liquid crystal layer 103). The colored sections 6 of the color filter are arranged at positions which correspond with the positions where the electrodes 105 and the electrodes 106 intersect.

Furthermore, polarizing plates which are not shown in the diagram are provided on the outer surfaces of the substrate 101 and the color filter 1, respectively. Furthermore, label 104 indicates a spacer for maintaining the gap between the substrates (called the cell gap) at a constant level within the substrate plane.

The electrodes 105 and 106 are formed of a transparent conductive material such as ITO (Indium Tin Oxide) in a striped pattern when viewed in a plan view.

In this liquid crystal device 100, because the colored sections 6 are formed in the formation sections 5, which are concave sections provided in the substrate 2, at least a portion of the colored sections 6 is embedded in the substrate 2, and the thickness of the colored section region can therefore be reduced, and consequently the light transmittance of the color filter 1 can be improved, thereby improving the brightness of the liquid crystal device 100.

Furthermore, because the colored sections 6 are at least partially embedded in the substrate 2, differences in level between the colored sections 6 and the ink repellant layer 3 can be minimized, and consequently the flatness of the over coat layer 7 can be ensured even if the over coat layer 7 is thinner than in conventional color filters, and it is possible to improve the light transmittance by reducing the thickness of the color filter 1, thereby improving the brightness of the liquid crystal device.

In addition, because of the formation of the ink repellant layer 3 with ink repellant properties, when discharging colored ink to form the colored sections 6, there is no danger of the discharged colored ink spreading outside the formation sections 5, and adjacent colored sections 6 do not contact each other resulting in color mixing, and color bleeding in the liquid crystal device 100 can be prevented.

[Fifth Embodiment]

Next, a liquid crystal device (display device) according to a fifth embodiment of the present invention is described with reference to the drawings.

Figure 41:
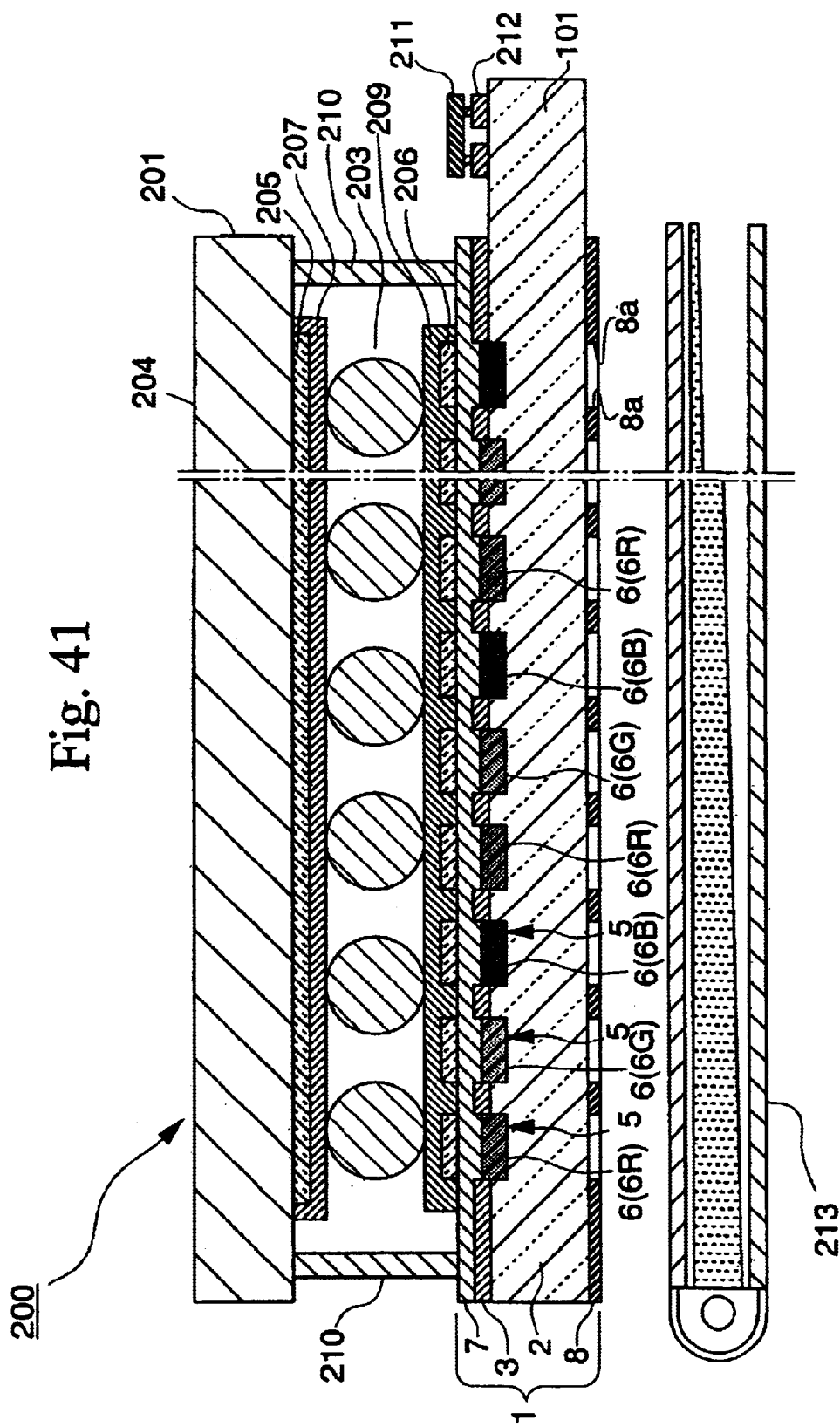
FIG. 41 is cross-sectional view showing the main elements of a liquid crystal device according to a fifth embodiment of the present invention.

FIG. 41 is a cross sectional view showing the general structure of a passive matrix liquid crystal device (liquid crystal device), which represents the fifth embodiment. A transmission type liquid crystal display device is formed as a final product by equipping a liquid crystal device 200 according to this embodiment with accessories such as a liquid crystal drive IC 211, wiring 212, a light source (backlight) 213, and a support and the like.

This liquid crystal device 200 comprises the color filter 1 described in the first embodiment as the color filter, and the color filter 1 is provided on the lower side (the opposite side to the side facing the observer). In the present embodiment, the color filter 1 will be described only in brief.

FIG. 41 shows the main elements of the transmission type liquid crystal device 200, and in the basic structure of this liquid crystal device 200, a liquid crystal layer 203 formed of a STN (Super Twisted Nematic) liquid crystal or the like is provided between the color filter 1 and a substrate 201 made of a glass substrate or the like. Furthermore, a sealing material 210 is provided between the outside edges of the color filter 1 and the outside edges of the substrate 201, and the section partitioned by the color filter 1, the substrate 201 and the sealing material 210 is filled with the liquid crystal layer 203.

The color filter 1 is the same as the color filter described in the first embodiment, and comprises a substrate 2, an ink repellant layer 3 formed on one surface 2a of the substrate, colored sections 6, an over coat layer 7 which covers the ink repellant layer 3 and the colored sections 6, and a light shielding layer 8. The colored sections 6 comprise red (R) colored sections 6R, green (G) colored sections 6G and blue (B) colored sections 6B.

A plurality of electrodes 206 are formed in a stripe pattern at predetermined intervals on top of the over coat layer 7 (on the side facing the liquid crystal layer 203) of the color filter 1, and an oriented film 209 is formed on top of the electrodes 206 (on the side facing the liquid crystal layer 203).

In the same manner, a plurality of electrodes 205 which extend in a direction orthogonal to the electrodes 206 on the color filter are formed in a stripe pattern at predetermined intervals on the surface of the substrate 201 which faces the color filter 1, and an oriented film 207 is formed beneath the electrodes 206 (on the side facing the liquid crystal layer 103). The colored sections 6 of the color filter 1 are arranged at positions which correspond with the positions where the electrodes 205 and the electrodes 206 intersect.

The electrodes 205 and 206 are formed of a transparent conductive material such as ITO (Indium Tin Oxide) in a striped pattern when viewed in a plan view.

Furthermore, polarizing plates, which are not shown in the diagram, are provided on the outer surfaces of the substrate 201 and the color filter 1, respectively. Furthermore, label 204 indicates a spacer for maintaining the gap between the substrates (called the cell gap) at a constant level within the substrate plane.

This liquid crystal device has the same effects as the liquid crystal device 100 of the fourth embodiment.

[Sixth Embodiment]

Next, a liquid crystal device (display device) according to a sixth embodiment of the present invention is described with reference to the drawings.

Figure 42:
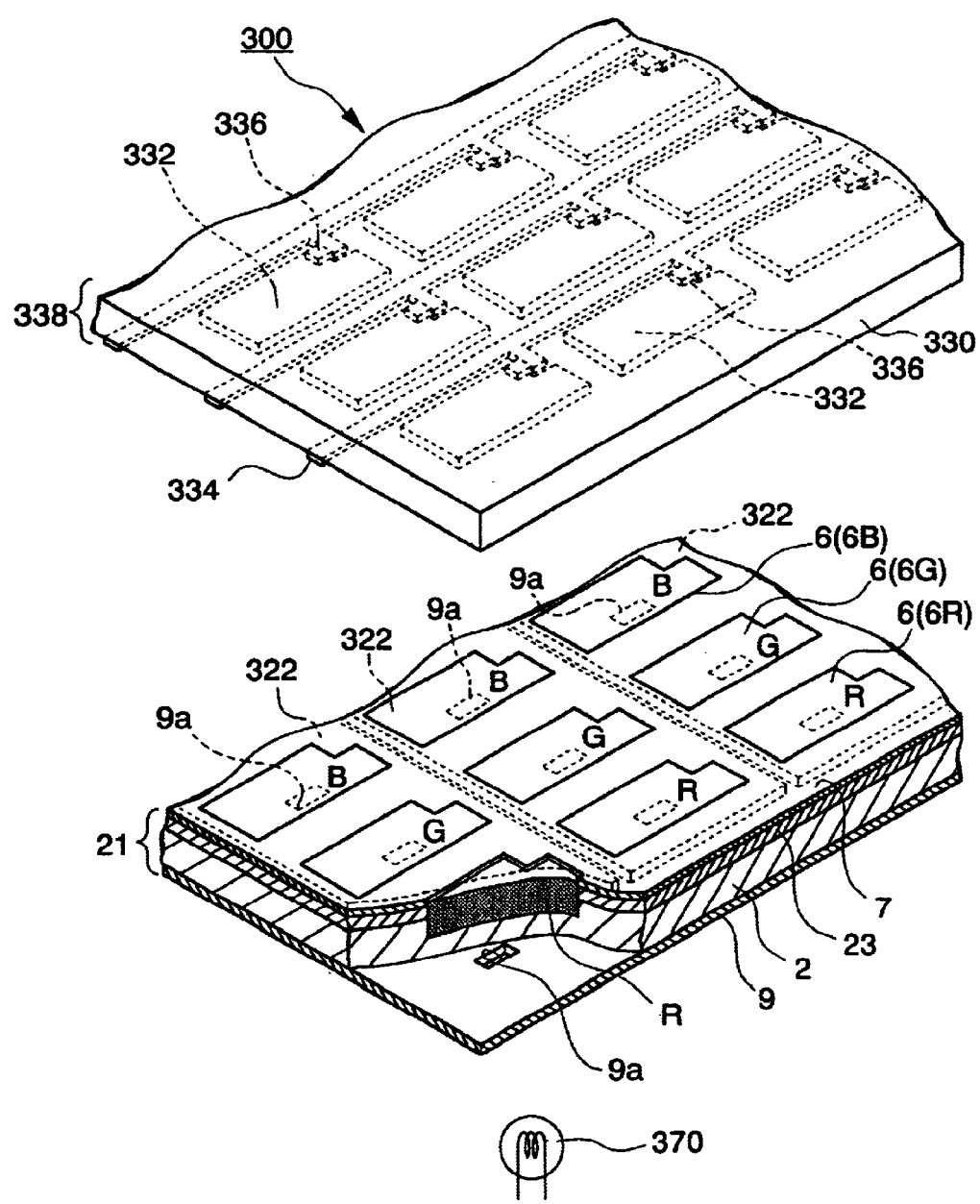
FIG. 42 is an exploded perspective view showing the main elements of a liquid crystal device according to a sixth embodiment of the present invention.

FIG. 42 is an exploded perspective view showing a half transmission half reflection type TFD (Thin Film Diode) type liquid crystal device 300, which represents the sixth embodiment of the present invention.

A reflection type liquid crystal display device is formed as a final product by equipping a liquid crystal device 300 according to this embodiment with accessories such as a liquid crystal drive IC and a support.

This liquid crystal device 300 comprises the color filter 21 described in the second embodiment as the color filter, and this color filter 21 is positioned on the lower side (the side opposite to the side facing the observer). In the present embodiment, the color filter 21 will be described only in brief.

As shown in FIG. 42, this liquid crystal device 300 is an active matrix type TFD (Thin Film Diode) type liquid crystal device, in which the color filter 21 and a substrate 338 are arranged opposing each other across a predetermined gap, and a liquid crystal which is not shown in the diagram is provided between the color filter 21 and the substrate 338.

Although not shown in the diagram, a sealing material is provided at the outside edges of the substrates 2 and 330, and the substrates 2 and 330 are joined and integrated in an opposing state, and the space between the substrates 2 and 330 is filled with the liquid crystal.

The substrate 338 is an element substrate, and a plurality of pixel electrodes 332 made of transparent electrodes such as ITO, and TFD elements 336 which control the pixel electrodes 332, are provided in a matrix pattern on the lower surface of the transparent substrate made of glass or the like. The TFD elements 336 are provided in one corner of the pixel electrodes 332. Furthermore, the TFD elements 336 are connected to a scanning line 334, and it is possible to switch the liquid crystal between a display state, a non-display state, or an intermediate state, based on an operation signal and a signal applied to a data line (counter electrode) 322 described below.

As shown in FIG. 42, the color filter 21 comprises a substrate 2, an ink repellant layer 23 made of a black photosensitive resin film which is formed on one surface (in other words the surface facing the liquid crystal layer) of the substrate 2, colored sections 6 and an over coat layer 7. Electrodes (counter electrodes) 322 in strip form which are made of ITO and constitute the data line are formed on top of the over coat layer 7.

Furthermore, a reflective layer 9 made of a metal film is formed over substantially the entire surface of the other surface of the substrate (in other words, the opposite surface to the surface which faces the liquid crystal layer). In addition, small rectangular windows 9a are formed in the reflective layer 9 near the center of each colored section 6, so that light from a light source (backlight) 370 provided outside the color filter 31 passes through to the substrate 338. In other words, in this liquid crystal device 300, reflective display is performed at the edges of the colored sections 6 by utilizing the reflective layer 9, whereas in the centers of the colored sections 6 transmission display is performed through the windows 9a.

The colored sections 6 are formed in a matrix pattern in positions opposing the pixel electrodes 332 of the substrate 338, and comprise blue colored sections ('B' in the diagram) 6B, green colored sections ('G' in the diagram) 6G, and red colored sections ('R' in the diagram) 6R. The colored sections 6 are arranged with space provided therebetween, and the ink repellant layer 23 made of a black photosensitive resin film is formed between the colored sections to correspond with the non image display regions (the regions where the pixel electrodes 332 of the other substrate 338 are not formed).

According to this liquid crystal device 300, the ink repellant layer 23 can be used as a light shielding layer, and there is no need to provide a separate light shielding layer, and consequently the thickness of the color filter 21 can be reduced, improving the light transmittance, and enabling the brightness of the liquid crystal device 300 to be improved.

Furthermore, in the same manner as in the liquid crystal device 200 of the fifth embodiment, in this liquid crystal device 300, the thickness of the color filter 21 itself can be reduced by an amount equivalent to the distance by which the colored sections 6 are embedded in the formation sections 5, and consequently the light transmittance of the color filter 21 can be improved, thereby improving the brightness of the liquid crystal device 300.

In addition, in the color filter 21 in the liquid crystal device 300, because the ink repellant layer 23 is formed around the thin walled sections 4, there is no danger of adjacent colored sections 6 contacting each other and resulting in color mixing, and color bleeding in the liquid crystal device 300 can be prevented.

[Seventh Embodiment]

Next, a liquid crystal device (display device) according to a seventh embodiment of the present invention is described with reference to the drawings.

Figure 43:
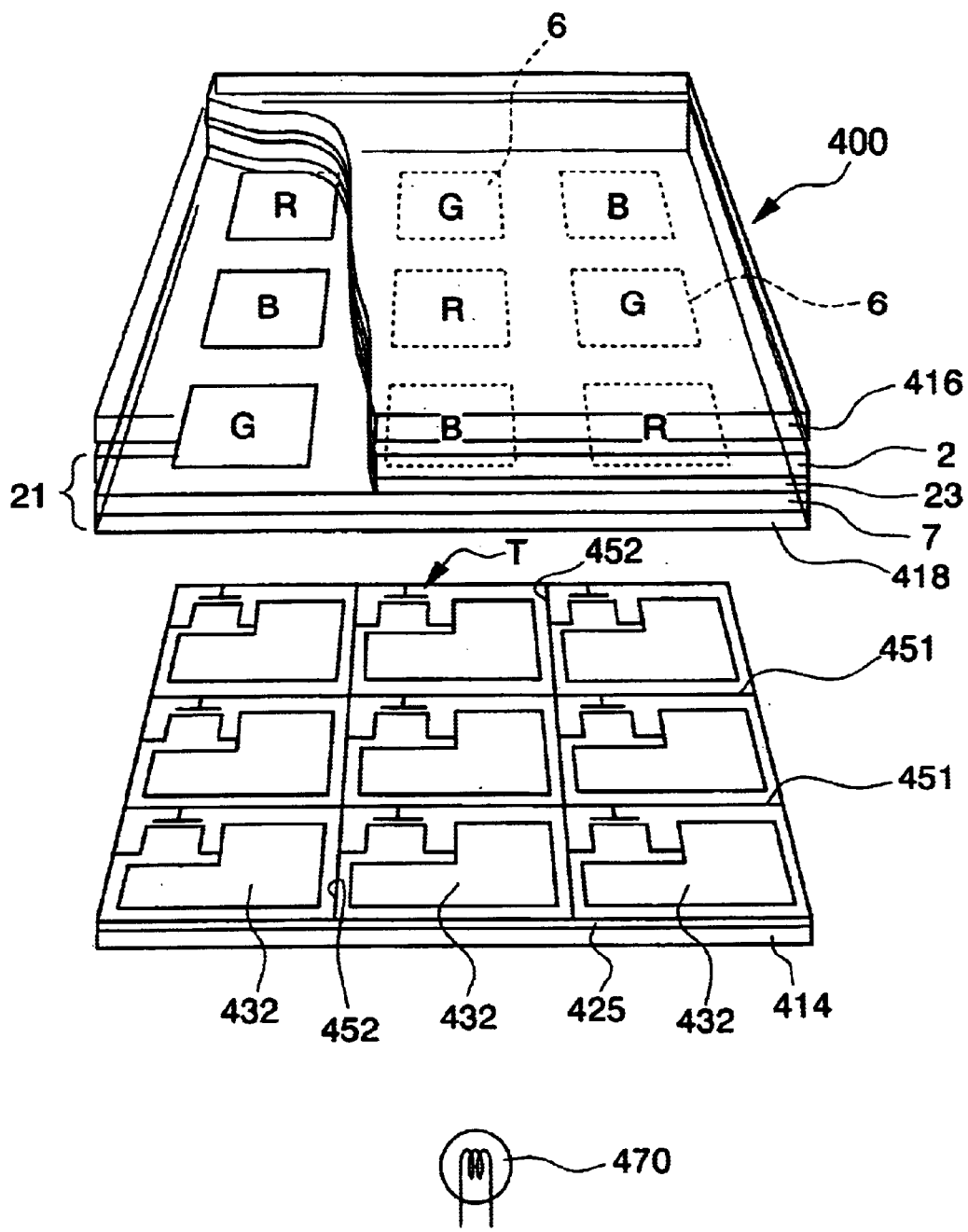
FIG. 43 is an exploded perspective view showing the main elements of a liquid crystal device according to a seventh embodiment of the present invention.

FIG. 43 is an exploded perspective view showing a transmission type TFT (Thin Film Transistor) liquid crystal device 400, which represents the seventh embodiment of the present invention.

A reflection type liquid crystal display device is formed as a final product by equipping a liquid crystal device 400 according to this embodiment with accessories such as a liquid crystal drive IC and a support.

This liquid crystal device 400 comprises the color filter 21 described in the second embodiment as the color filter, and the color filter 21 is positioned on the upper side (the side facing the observer). In the present embodiment, the color filter 21 will be described only in brief.

The liquid crystal device 400 of this embodiment comprises mainly a color filter 21 and a glass substrate 414 which are positioned facing each other, a liquid crystal layer not shown in the diagram which is provided between the color filter 21 and glass substrate 414, a polarizing plate 416 provided on the upper surface (the side facing the observer) of the color filter 21, and a polarizing plate which is not shown in the diagram provided on the lower side of the glass substrate 414. The color filter 21 is the front substrate, comprising a transparent glass substrate 2, and is provided facing the observer, whereas the glass substrate 414 is a transparent substrate provided on the opposite side, that is the rear side. Furthermore, light from a light source (backlight) 470 provided outside the glass substrate 414 passes through to the glass substrate 414.

The substrate 2 is a glass substrate with a thickness of approximately 300 μm (0.3 mm), and an ink repellant layer 23 made of a black photosensitive resin film, colored sections 6 and an over coat layer 7 are formed sequentially on the lower surface of this substrate 2, and in addition, a drive electrode 418 is formed under the over coat layer 7 (on the side facing the liquid crystal layer). In actual liquid crystal devices, an oriented film which covers the electrode 418 can be provided on the liquid crystal layer side, but this is omitted in FIG. 43, and an oriented film can also be provided on the electrode 432 (described below) on the glass substrate 414, which is on the opposite side, but this is also omitted in FIG. 43, and descriptions of these oriented films are also omitted.

As shown in FIG. 43, the color filter 21 comprises a substrate 2, an ink repellant layer 23 formed of a black photosensitive resin film which is formed on the lower surface of the substrate 2 (in other words the surface facing the liquid crystal layer), colored sections 6 and an over coat layer 7.

The liquid crystal drive electrode 418 formed on the liquid crystal layer side of the color filter 21 is formed of a transparent conductive material such as ITO (Indium Tin Oxide) across the entire surface of the over coat layer 7.

An insulating layer 425 is formed on top of the glass substrate 414, and thin film transistors T which functions as TFT switching elements, and pixel electrodes 432 are formed on this insulating layer 425.

Scanning lines 451 and signal lines 452 are formed in a matrix pattern on the insulating layer 425 which is formed on the glass substrate 414, and a pixel electrode 432 is provided in each region enclosed by these scanning lines 451 and these signal lines 452, and thin film transistors T are incorporated into the corner sections of each pixel electrode 432 and the sections between the scanning lines 451 and the signal lines 452. The construction of the thin film transistors T is such that the thin film transistors T can be switched on/off by applying a signal to the scanning lines 451 and the signal lines 452 thereby controlling the electrical flow to the pixel electrodes 432. Furthermore, in this embodiment the electrode 418 formed facing the color filter 21 on the opposite side is a whole surface electrode which covers the entire region where the pixel electrodes are formed. A variety of TFT wiring circuits and pixel electrode shapes can be used, and although the shapes shown in FIG. 43 were used as an example in the present embodiment, this embodiment can also be applied to liquid crystal devices comprising other forms of TFT.

This liquid crystal device 400 has the same effects as the liquid crystal 300 of the sixth embodiment.

[Eighth Embodiment]

Next, a display device according to an eighth embodiment of the present invention is described with reference to the drawings.

Figure 44:
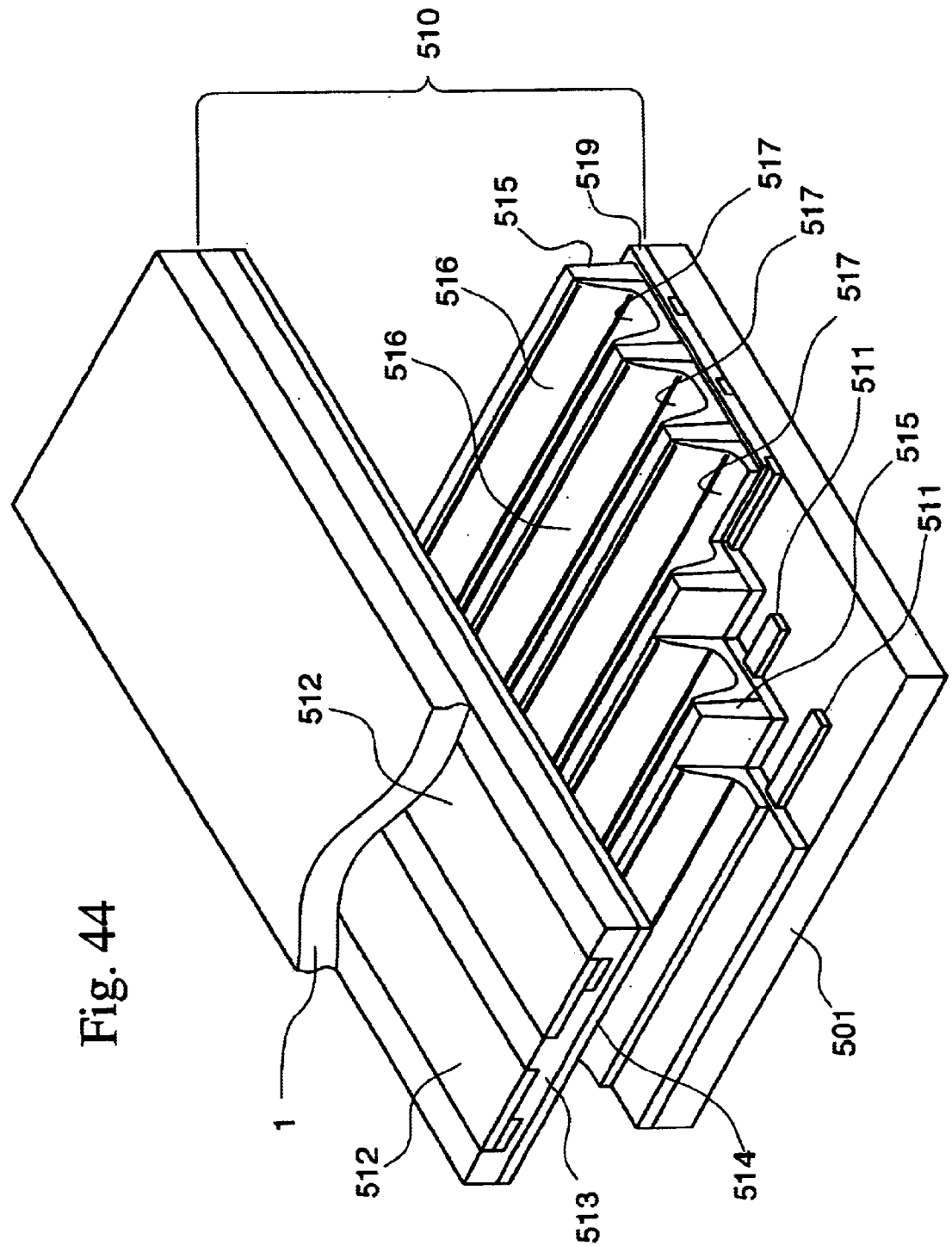
FIG. 44 is an exploded perspective view showing the main elements of a liquid crystal device according to an eighth embodiment of the present invention.
Figure 45:
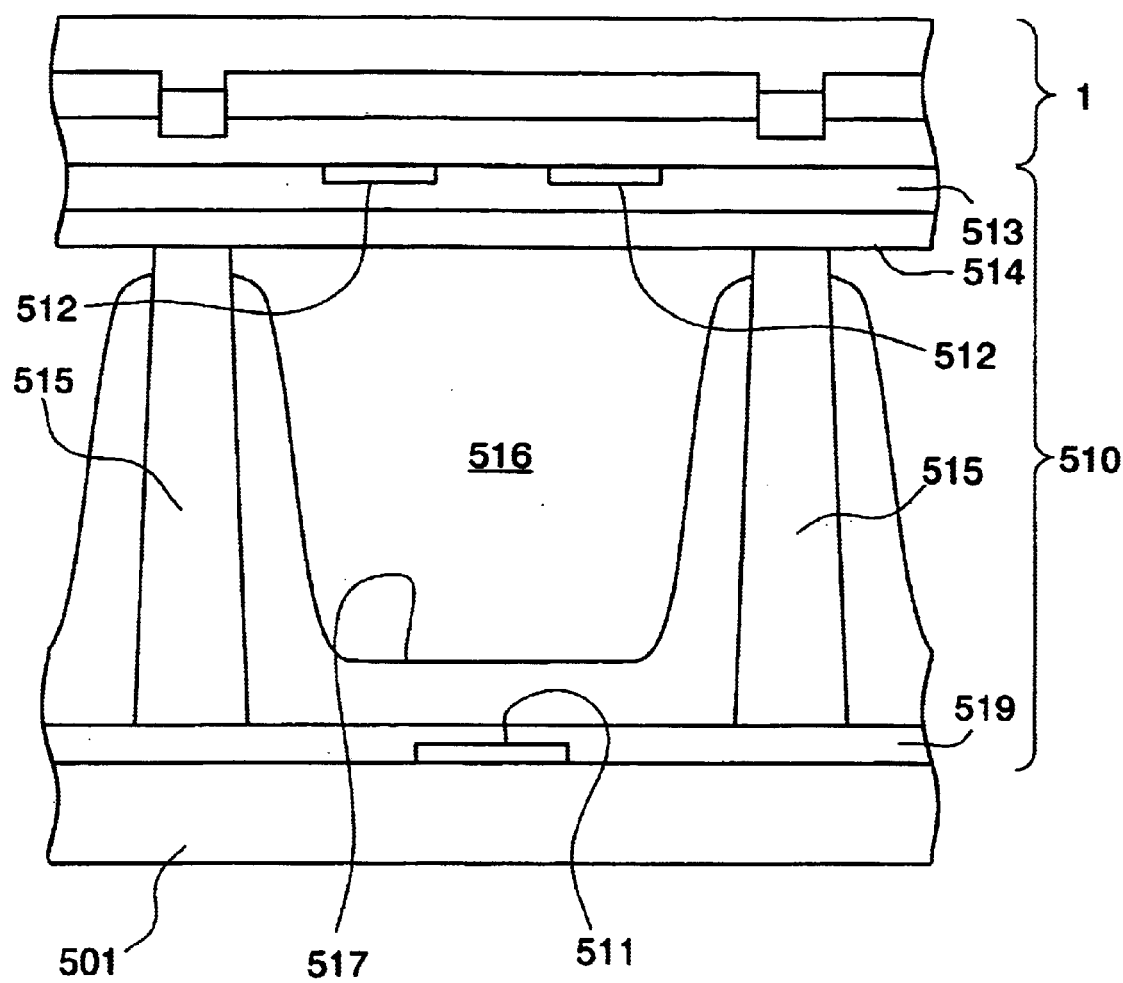
FIG. 45 is a cross-sectional view showing the main elements of the liquid crystal device shown in FIG. 44.

FIG. 44 is a basic conceptual diagram showing a plasma display device 500 of the present embodiment, and FIG. 45 is an exploded perspective view showing the plasma display device 500.

The plasma display device 500 of the present embodiment comprises a color filter equivalent to the color filter 1 described in the second embodiment, and the color filter 1 is arranged facing the observer. The plasma display device 500 comprises mainly a glass substrate 501 and the color filter 1 which are arranged facing each other, and a discharge display section 510 formed between the glass substrate 501 and the color filter 1.

In the discharge display section 510, a plurality of discharge chambers 516 are assembled, and arranged so that a group of three discharge chambers 516 form one pixel. Accordingly, discharge chambers 516 are provided to correspond with the colored sections 6 in the color filter 1.

Address electrodes 511 are formed in a stripe pattern at predetermined intervals on the upper surface of the (glass) substrate 501, and a dielectric layer 519 is formed so as to cover the address electrodes 511 and the upper surface of the substrate 501, and furthermore, partitions 515 are formed in positions between adjacent address electrodes 511 so as to run parallel with the address electrodes 511. The partitions 515 are divided at predetermined positions in the lengthwise direction of the partitions 515 (not shown in the drawing), in a direction orthogonal to the address electrodes 511, thereby forming rectangular regions divided by adjacent partitions provided to the left and right of the address electrodes 511 in a crosswise direction, and the partitions provided in a direction orthogonal to the address electrodes 511. Discharge chambers 516 are formed to correspond with these rectangular regions, and three of these rectangular regions as a single group form one pixel. Furthermore, a fluorescent material 517 is formed inside the rectangular regions partitioned by the partitions 515.

Next, a plurality of display electrodes 512 are formed on the color filter 1 at predetermined intervals in a direction orthogonal to the address electrodes 511 (in FIG. 44, for the sake of convenience, the direction of the address electrodes differs from their actual direction), a dielectric layer 513 is formed covering these display electrodes 512, and furthermore, a protective film 514 formed of MgO or the like is then formed. The substrate 501 and the substrate 2 of the color filter 1 are positioned facing each other and are affixed together such that the address electrodes 511 and the display electrodes 512 are orthogonal to each other. The discharge chambers 516 are formed by evacuating the vacant sections enclosed by the substrate 501, the partitions 515 and the protective film 514 formed on the color filter 1 and filling them with a noble gas. The display electrodes 512 formed on the color filter 1 are formed such that there are two display electrodes 512 provided for each discharge chamber 516.

The address electrodes 511 and the display electrodes 512 are connected to an AC power supply which is not shown in the diagram, and by energizing each electrode, excitation luminescence of the fluorescent material in the discharge display section 510 is produced in the desired location causing the material to illuminate white, and viewing this luminescence via the color filter 1 enables color display.

According to this display device 500, substantially the same effects as the liquid crystal device 100 of the fourth embodiment can be obtained.

[Ninth Embodiment]

Next, specific examples of electrical equipment comprising any of the liquid crystal devices (display devices) 100, 200, 300, 400 according to the fourth, fifth, sixth and seventh embodiments are described.

Figure 46A:
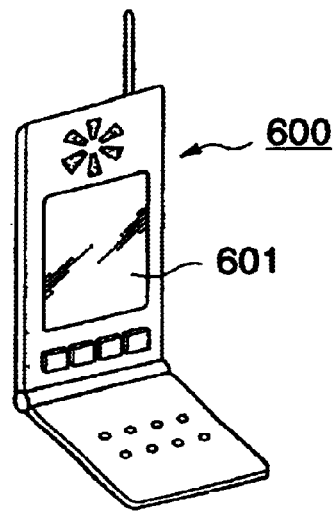
FIG. 46A to FIG. 46C are cross-sectional views showing electronic equipment according to a ninth embodiment of the present invention.

FIG. 46A is a perspective view showing an example of a mobile telephone. In FIG. 46A, label 600 indicates the main body of the mobile telephone, and label 601 indicates a liquid crystal display section using one of the liquid crystal devices 100, 200, 300 or 400.

Figure 46B:
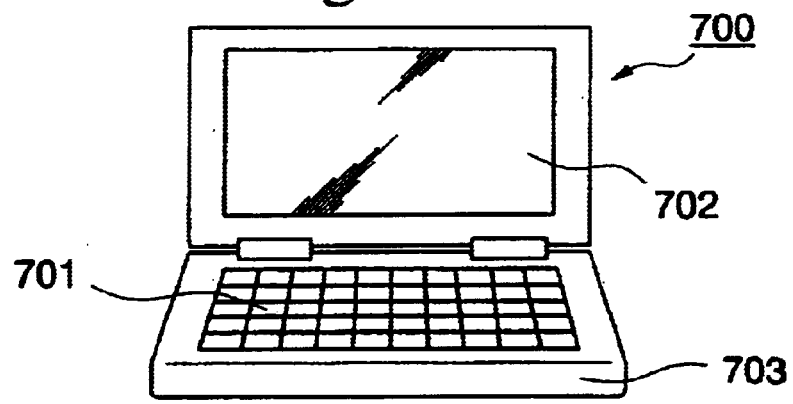

FIG. 46B is a perspective view showing an example of a portable information processing device such as a word processor or a personal computer. In FIG. 46B, label 700 indicates an information processing device, label 701 indicates an input section such as a keyboard, label 703 indicates the main body of the information processing device, and label 702 indicates a liquid crystal display section using one of the liquid crystal devices 100, 200, 300 or 400.

Figure 46C:
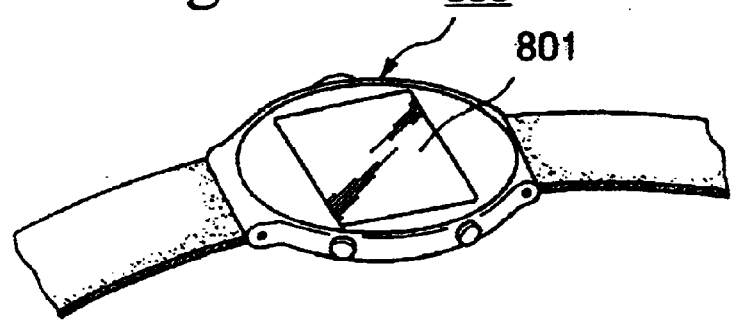
Figure 47:
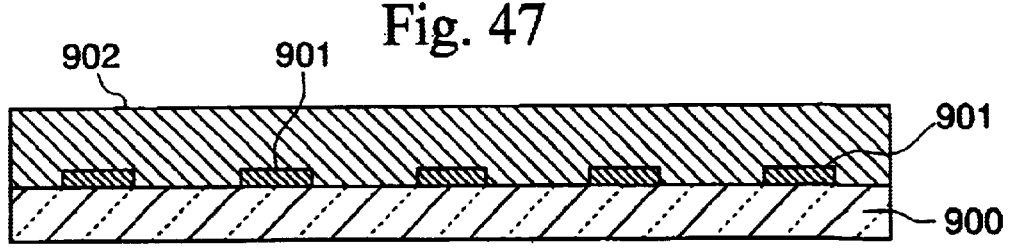
FIG. 47 is a process drawing describing a manufacturing method of a conventional color filter.
Figure 48:
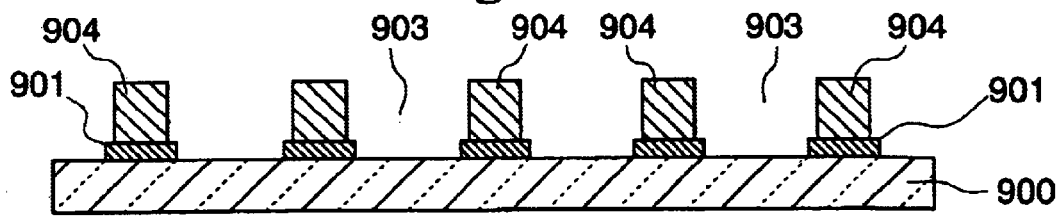
FIG. 48 is a process drawing describing a manufacturing method of a conventional color filter.
Figure 49:
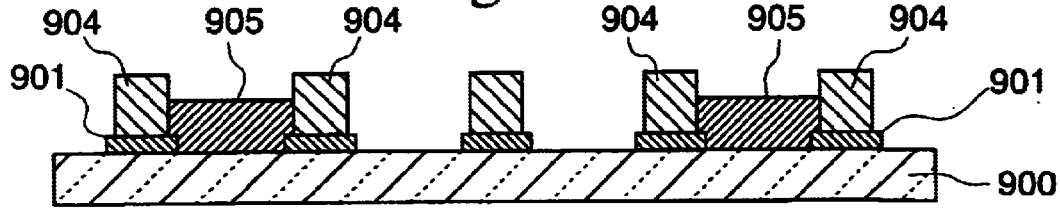
FIG. 49 is a process drawing describing a manufacturing method of a conventional color filter.
Figure 50:
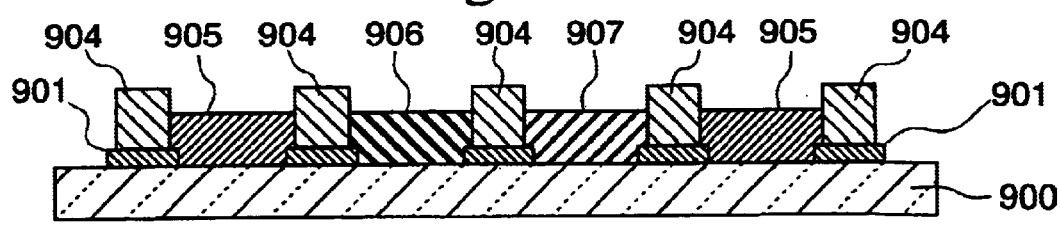
FIG. 50 is a process drawing describing a manufacturing method of a conventional color filter.
Figure 51:
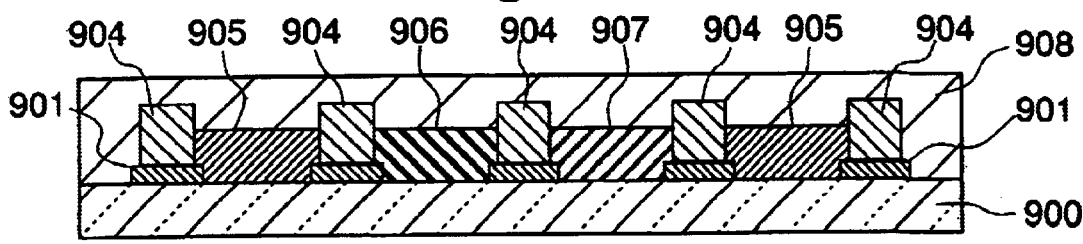
FIG. 51 is a process drawing describing a manufacturing method of a conventional color filter.

FIG. 46C is a perspective view showing an example of electronic equipment in wristwatch form. In FIG. 46C, label 800 indicates the wristwatch main body, and label 801 indicates a liquid crystal display section using one of the liquid crystal devices 100, 200, 300 or 400.

The respective pieces of electronic equipment shown in FIG. 46A to FIG. 46C comprise a liquid crystal display using one of the liquid crystal devices 100, 200, 300 or 400, which has the characteristics of the liquid crystal devices 100, 200, 300 or 400 previously described in the fourth through eighth embodiments, and regardless of which liquid crystal device is used, electronic equipment which is thin, compact and lightweight, and has high brightness and excellent display quality can be achieved.

As described in detail above, according to a color filter of the present invention, because the colored sections are formed in formation sections partitioned by the thin walled sections and the ink repellant layer, the colored sections are at least partially embedded in the substrate, and the thickness of the colored section region can be reduced, and consequently the light transmittance of the color filter can be improved.

Furthermore, because the colored sections are at least partially embedded in the substrate, the difference in level between the colored sections and the ink repellant layer can be minimized, and consequently the flatness of the over coat layer can be ensured even if the over coat layer is formed more thinly than in conventional color filters, and it is consequently possible to improve the light transmittance by reducing the thickness of the color filter.

In addition, because the ink repellant layer which has colored ink repellant properties is formed around the thin walled sections, when colored ink is discharged to form the colored sections, there is no danger of the discharged colored ink spreading outside the formation sections, and there is no danger of adjacent colored sections contacting each other and resulting in color mixing.

Furthermore, according to a display device of the present invention, because at least a portion of the colored sections in the color filter is embedded in the substrate, the thickness of the colored section regions can be reduced, and it is therefore possible to improve the light transmittance of the color filter, thereby improving the brightness of the display device.

Furthermore, because the colored sections are at least partially embedded in the substrate, the difference in level between the colored sections and the ink repellant layer can be minimized, and consequently the over coat layer can be made thinner than in conventional color filters, reducing the thickness of the color filter and improving the light transmittance, thereby improving the brightness of the display device.

In addition, because the ink repellant layer is formed around the thin walled sections, when colored ink is discharged to form the colored sections, there is no danger of the discharged colored ink spreading outside the formation sections, and no danger of adjacent colored sections contacting each other and resulting in color mixing, and color bleeding in the display device can be prevented.

Furthermore, according to a color filter manufacturing method of the present invention, because the formation sections are provided by etching the substrate exposed through a plurality of holes provided in the ink repellant layer, the ink repellant layer surrounds the formation sections, and even when colored ink is discharged towards these formation sections, there is no danger of the colored ink spreading outside the formation sections, and adjacent colored sections do not contact each other resulting in color mixing.

What is claimed is:

1. A color filter produced by forming a plurality of colored sections on a substrate, comprising:
a plurality of concave sections formed on one surface of said substrate, an ink repellant layer formed between adjacent concave sections, formation sections formed by said concave sections and said ink repellant layer, said colored sections being formed in each of said formation sections, and a thickness $t_3$ of said colored sections is set to a value less than a depth $t_1$ of said concave sections.

2. The color filter according to claim 1, at least an upper surface of said ink repellant layer has ink repellant properties, and said formation sections are partitioned by said concave sections and wall surfaces of said ink repellant layer which are continuations of wall surfaces of said concave sections.

3. The color filter according to claim 1, the thickness $t_3$ of said colored sections is set to a value less than a combined total $(t_1+t_2)$ of the depth $t_1$ of said concave sections and a layer thickness $t_2$ of said ink repellant layer.

4. The color filter according to claim 1, said ink repellant layer is formed of an ink repellant photosensitive resin film, and a light shielding layer is formed on another surface of said substrate.

5. The color filter according to claim 1, said ink repellant layer is formed by layering an ink repellant photosensitive resin film and a light shielding film.

6. The color filter according to claim 1, said ink repellant layer is formed of an ink repellant black photosensitive resin film.

7. A display device, comprising a color filter on one of a pair of substrates which face each other with a liquid crystal disposed therebetween,
a plurality of concave sections formed on one surface of said substrate, an ink repellant layer formed between adjacent concave sections, formation sections formed by said concave sections and said ink repellant layer, said color filter being formed by forming a plurality of colored sections in said formation sections, and a thickness $t_3$ of said colored sections is set to a value less than a depth $t_1$ of said concave sections.

8. The display device according to claim 7, at least an upper surface of said ink repellant layer has ink repellant properties, and said formation sections are partitioned by said concave sections and wall surfaces of said ink repellant layer which are continuations of wall surfaces of said concave sections.

9. The display device according to claim 7, the thickness $t_3$ of said colored sections is set to a value less than a combined total $(t_1+t_2)$ of the depth $t_1$ of said concave sections and a layer thickness $t_2$ of said ink repellant layer.

10. The display device according to claim 7, said ink repellant layer is formed of an ink repellant photosensitive resin film, and a light shielding layer is formed on a rear surface of said substrate.

11. The display device according to claim 7, said ink repellant layer is formed by layering an ink repellant photosensitive resin film and a light shielding film.

12. The display device according to claim 7, said ink repellant layer is formed of an ink repellant black photosensitive resin film.

13. Electronic equipment, comprising the display device according to claim 7.

14. A display device comprising a color filter on one of a pair of substrates which face each other with a discharge display section disposed therebetween, a plurality of concave sections formed on one surface of said substrate, an ink repellant layer formed between adjacent concave sections, formation sections formed by said concave sections and said ink repellant layer, said color filter being formed by forming a plurality of colored sections in said formation sections, and a thickness $t_3$ of said colored sections is set to a value less than a depth $t_1$ of said concave sections.

15. The display device according to claim 14, at least an upper surface of said ink repellant layer has ink repellant properties, and said formation sections are partitioned by said concave sections and wall surfaces of said ink repellant layer which are continuations of wall surfaces of said concave sections.

16. The display device according to claim 14, the thickness $t_3$ of said colored sections is set to a value less than a combined total $(t_1+t_2)$ of the depth $t_1$ of said concave sections and a layer thickness $t_2$ of said ink repellant layer.

17. The display device according to claim 14, said ink repellant layer is formed of an ink repellant photosensitive resin film, and a light shielding layer is formed on a rear surface of said substrate.

18. The display device according to claim 14, said ink repellant layer is formed by layering an ink repellant photosensitive resin film and a light shielding film.

19. A display device according to claim 14, wherein said ink repellant layer is formed of an ink repellant black photosensitive resin film.

20. Electronic equipment, comprising the display device according to claim 14.

21. A color filter manufacturing method, comprising:
   forming an ink repellant layer on one surface of a substrate;
   forming concave sections by patterning said ink repellant layer and etching said substrate thus exposed; and
   forming colored sections by discharging colored ink into formation sections formed by said concave sections and said ink repellant layer and subsequently drying said colored ink; and
   setting a thickness $t_3$ of said colored sections to a value less than a depth $t_1$ of said concave sections.

22. The color filter manufacturing method according to claim 21, said ink repellant layer is formed of either one of a transparent photosensitive resin film and a black transparent photosensitive resin film, and said transparent photosensitive resin film or said black transparent photosensitive resin film is patterned by placing a photomask thereon and exposing and developing said film.

23. The color filter manufacturing method according to claim 21, said ink repellant layer is formed by sequentially layering a light shielding film and a transparent photosensitive resin film on said substrate, placing a photomask on said transparent photosensitive resin film and then exposing and developing to remove a portion of said transparent photosensitive resin film, etching a portion of said light shielding layer thus exposed, and patterning said ink repellant layer.

* * * * *